(12) United States Patent
Schmolke et al.

(10) Patent No.: US 12,362,614 B2
(45) Date of Patent: Jul. 15, 2025

(54) ROTOR FOR AN AXIAL FLUX MOTOR

(71) Applicant: BorgWarner Inc., Auburn Hills, MI (US)

(72) Inventors: Jan Schmolke, Kirchheimbolanden (DE); Dietmar Metz, Meckenheim (DE); Frank Haase, Markdorf (DE)

(73) Assignee: BorgWarner Inc., Auburn Hills, MI (US)

( * ) Notice: Subject to any disclaimer, the term of this patent is extended or adjusted under 35 U.S.C. 154(b) by 233 days.

(21) Appl. No.: 18/098,499

(22) Filed: Jan. 18, 2023

(65) Prior Publication Data
US 2024/0204597 A1 Jun. 20, 2024

(30) Foreign Application Priority Data
Dec. 15, 2022 (EP) ..................................... 22213895

(51) Int. Cl.
*H02K 1/28* (2006.01)
*F04D 19/00* (2006.01)
*F04D 25/06* (2006.01)
*H02K 1/279* (2022.01)
*H02K 1/2796* (2022.01)
*H02K 21/24* (2006.01)

(52) U.S. Cl.
CPC ............. *H02K 1/28* (2013.01); *F04D 19/002* (2013.01); *F04D 25/06* (2013.01); *H02K 1/2796* (2022.01); *H02K 21/24* (2013.01)

(58) Field of Classification Search
CPC ........ H02K 1/28; H02K 1/2796; H02K 21/24; H02K 16/04; H02K 15/03; F04D 19/002; F04D 25/06

USPC ................................................ 310/156.32, 43
See application file for complete search history.

(56) References Cited

U.S. PATENT DOCUMENTS

| | | | | |
|---|---|---|---|---|
| 6,489,696 B2 * | 12/2002 | Sashino | ............... | H02K 1/2733 310/156.01 |
| 7,679,260 B2 * | 3/2010 | Yamamoto | ........... | H02K 1/2796 310/156.43 |
| 7,906,930 B2 * | 3/2011 | Takeuchi | ................ | B60L 15/20 318/135 |
| 8,040,008 B2 * | 10/2011 | Kawamura | .......... | H02K 1/2796 310/156.43 |
| 10,075,030 B2 * | 9/2018 | Klassen | .................... | B25J 15/08 |
| 10,141,822 B2 * | 11/2018 | Ricci | ........................ | H02K 1/30 |

(Continued)

*Primary Examiner* — Burton S Mullins
(74) *Attorney, Agent, or Firm* — Eric L. Doyle; Stephan A. Pendorf; Patent Central LLC

(57) ABSTRACT

The present disclosure relates to a rotor 10 for an axial flux motor 1. The rotor 10 comprises a rotor wheel 100, a plurality of permanent magnets 50 and a holding structure 60. The rotor wheel 100 comprises disk-shaped main body 110 and a plurality of arms 120. The disk-shaped main body 110 defines an inner circumference 111 and an outer circumference 114. The plurality of arms 120 protrude from the outer circumference 114 radially outwards to a respective arm tip 123. The plurality of arms 120 is circumferentially distributed on the outer circumference 114. The plurality of permanent magnets 50 is distributed circumferentially about the outer circumference 114 and arranged circumferentially between the plurality of arms 120. The holding structure 60 is attached to the rotor wheel 100 and to the plurality of permanent magnets 50 to hold the plurality of permanent magnets 50 in position.

18 Claims, 8 Drawing Sheets

(56) References Cited

U.S. PATENT DOCUMENTS

| | | | |
|---|---|---|---|
| 10,253,676 B2* | 4/2019 | Gossling | H02K 7/14 |
| 11,296,561 B2* | 4/2022 | Zhang | F04D 25/088 |
| 2015/0229194 A1* | 8/2015 | Sromin | H02K 16/02 |
| | | | 310/156.32 |
| 2021/0351658 A1* | 11/2021 | Jore | H02K 5/203 |
| 2022/0255379 A1* | 8/2022 | Rossi | H02K 15/03 |

\* cited by examiner

A-A

B-B

A-A

C-C

ROTOR FOR AN AXIAL FLUX MOTOR

TECHNICAL FIELD

The present disclosure relates to a rotor for an axial flux machine.

BACKGROUND

Electric machines have been used in various technical fields for the generation of kinetic energy for many decades. An electric machine (also called an electric motor or e-motor) is an electrical device that is configured to convert electrical energy into mechanical energy. The mechanical energy may, in turn, be used to generate kinetic energy that may be utilized to drive other devices. An electric motor may generally comprise a stator and a rotor, which are housed in a motor casing. The stator may be fixed in position and the rotor may move relative to the stator. Commonly the rotor is rotatably fixed on a shaft that rotates with the rotor. The shaft may be used to transmit rotational energy to other devices. Most electric motors generate energy with a magnetic field and a winding current.

Generally, electric machines may be distinguished between radial flux machines and axial flux machines.

Radial flux machines usually comprise a rotor which is formed by a cylindrical body carrying magnets about its circumference. The stator is regularly configured hollow cylindrically and surrounds the rotor radially distanced. On its inner circumference, the stator usually carries several circumferentially distributed winding elements. Each winding element comprises a stator tooth which extends radially from a stator yoke towards the rotor. The stator tooth is wound by a wire of a metallic, good conducting material such as copper to form the winding. When an electric current is applied to the windings, the rotor attached to the shaft of the motor is subjected to a torque resulting from the magnetic field. The magnetic flux generated is a radial flux in a radial flux machine.

In axial flux machines, the rotor usually comprises a disk-shaped rotor body with two circular surfaces connected by a thickness. The two circular surfaces usually point in opposing axial directions. The disk-shaped rotor body may be bounded by an outer rim and an inner circumference defining a space for a shaft. Typically, at least two permanent magnets are attached to at least one of the two circular surfaces of the rotor body, referred to as the attachment surface. The stator is regularly disk-shaped and arranged in a fixed position axially spaced from the rotor. On its side facing the rotor, the stator carries a plurality of circumferentially distributed winding elements. Each winding element comprises a respective stator tooth which extends in the axial direction from a stator yoke towards the rotor. The stator tooth is wound by a wire of a metallic, good conducting material such as copper to form the winding. When electrical current is supplied to the windings, the rotor attached to the shaft of the motor is subjected to a torque resulting from the magnetic field. The magnetic flux generated is an axial flux in an axial flux machine. The rotor of an axial flux machine can be driven by a stator on one side of the rotor or by two stators on either side of the rotor. In a rotor with a single air gap designed to be driven by a single stator, a single circular face of the rotor body usually carries the permanent magnets. In a two air gap rotor intended to be operated with two stators, both circular surfaces usually carry the magnets. The magnets are held on the respective circular surface by holding means, leaving a space between the at least two magnets on the same surface. In both variants, the same magnets can also be held in the rotor body in such a way that they are in flush contact with both circular surfaces, e.g. by forming pockets or windows in the rotor body, more specifically in or through the circular surfaces.

The constant further development of electric motors and the trend towards using electric current as an energy carrier and source is leading to a continuous expansion of the application portfolio of electric motors. Electric motors are not only used in small electronic devices such as notebooks or household appliances, which are usually operated in the low-voltage range. Increasingly, electric motors of larger dimensions are also being used in the high-voltage range with operating voltages of up to 800 volts or 850 volts and more.

Electric motors, specifically in high-voltage applications, typically generate a large amount of heat during operation. In operation of an axial flux motor, magnetic forces may in addition to provide a torque moment urge the permanent magnets axially. This results in the risk of a rotor tending to bend axially towards the stator which in the worst outcome may lead to a rotor touching the stator. Eventually, this may lead to a failure or damage of the axial flux motor. Further challenges include the reduction of rotor eddy current losses. Rotor eddy current losses may lead to an increment of rotor temperature, may affect the efficiency of motor performance and may even lead to permanent magnet demagnetization.

The object of the present disclosure is to provide a more reliable rotor for an axial flux motor which is improved in terms of rotor eddy currents.

SUMMARY

The present disclosure relates to a rotor for an axial flux machine. The present disclosure further relates to an axial flux machine with such a rotor and a high-volt fan with such an axial flux motor. Additionally, the present disclosure provides a method for manufacturing the rotor for an axial flux machine.

According to a first aspect of the present invention, a rotor for an axial flux motor is provided. The rotor comprises a rotor wheel, a plurality of permanent magnets and a holding structure. The rotor wheel comprises a disk-shaped main body defining an inner circumference and an outer circumference. The rotor wheel further comprises a plurality of arms protruding from the outer circumference radially outwards to a respective arm tip. The plurality of arms is circumferentially distributed on the outer circumference. The plurality of permanent magnets is distributed circumferentially about the outer circumference and arranged circumferentially between the plurality of arms. The holding structure is attached to the rotor wheel and to the plurality of permanent magnets to hold the plurality of permanent magnets in position. Providing a rotor wheel with arms extending radially outwards may improve the mechanical strength, specifically the bending stiffness, of the whole rotor. Thereby, the risk of the rotor touching a stator of the axial flux motor and a failure or damage of the axial flux motor may be prevented or at least reduced. Improving the bending stiffness is important to confront the influence of thermal deformations, assembling tolerances and vibrations on the rotor. In addition axial forces induced by a magnetic field in the permanent magnets during operation of the axial flux motor may act on the rotor, specifically may urge the rotor or portions of the rotor to an axial side. By the provision of the holding structure, mechanical forces can be transmitted between the permanent magnets and the rotor wheel. Specifically, by the provision of the arms in combination with the holding structure mechanical forces can be transferred to the disk-shaped main body and further to a shaft of the axial flux motor on which the rotor is fixed in an assembled state.

In embodiments, at least one of the plurality of permanent magnets may extend along a radial length from a radial inner end to a radial outer end of the permanent magnet. At least one of the plurality of arms may protrude radially outwards to a radial position between the radial inner end and the radial outer end of a respective permanent magnet. In embodiments, at least one of the plurality of arms may extend from the outer circumference radially outwards along a protruding arm length to the arm tip. The arm tip may be arranged at a radial position between 0.1 to 0.9 of the radial length of a permanent magnet. Specifically, the arm tip may be arranged at a radial position between 0.2 to 0.8 of the radial length of a permanent magnet. More specifically the arm tip may be arranged at a radial position between 0.25 to 0.75 of the radial length of a permanent magnet. These embodiments, specifically a radial position of the arm tip between 0.25 to 0.75 may provide an optimized trade-off between improved bending stiffness and reduced eddy current losses.

In embodiments, the arm tip of at least one of the plurality of arms may be tapered. Specifically, the arm tip of several or each of the plurality of the plurality of arms may be tapered. Thereby, a stiffness gap between the rotor wheel, specifically the at least one arm, and the holding structure can be prevented or at least reduced.

In embodiments, each of the plurality of arms may have an arm length in the radial direction, an arm height in the axial direction and an arm width orthogonally to the arm length arm height. In embodiments, the arm height may taper towards the arm tip at least in a portion of the arm length. Specifically, the arm height may taper towards the arm tip at least in a portion of 0.1 of the arm length before the arm tip. More specifically, the arm height may taper towards the arm tip at least in a portion of 0.2 of the arm length before the arm tip. In embodiments, the arm width may taper towards the arm tip at least in a portion of the arm length. Specifically, the arm width may taper towards the arm tip at least in a portion of 0.1 of the arm length before the arm tip. More specifically, the arm width may taper towards the arm tip at least in a portion of 0.2 of the arm length before the arm tip. In embodiments, a shape of the arm in a cross-sectional plane defined be the arm height and the arm width may be substantially rectangularly shaped or oval shaped. In embodiments, at least in a circumferentially outer region of the disk-shaped main body, the arm height may be larger than an axial thickness of the disk-shaped main body such that the arm extends radially inward from the outer circumference while protruding axially from the disk-shaped main body. Thereby, the attachment of the holding structure may be improved. In embodiments, the circumferentially outer region of the disk-shaped main body may extend from the outer circumference to an intermediate circumference arranged along a radial position radially between the inner circumference and the outer circumference. In embodiments the intermediate circumference may be arranged along a radial position between 0.4 and 0.9 of a radial length between the inner circumference and the outer circumference. Specifically, the intermediate circumference may be arranged along at a radial position between 0.5 and 0.8 of a radial length between the inner circumference and the outer circumference. More specifically, the intermediate circumference may be arranged along at a radial position between 0.6 and 0.7 of a radial length between the inner circumference and the outer circumference.

In embodiments, the disk-shaped main body and the plurality of arms may be formed integrally. Specifically, the disk-shaped main body and the plurality of arms may be formed integrally in one-piece.

In embodiments, the rotor wheel may comprise a ceramic material or a metallic material. In examples, the rotor wheel may comprise an aluminum material. Specifically, the rotor wheel may be made of a ceramic material or a metallic material, more specifically an aluminum material. In examples, the aluminum material may be an aluminum alloy. The rotor wheel comprising a ceramic or metallic material leads to an improved mechanical strength compared to, for instance polymer or resin materials. Thereby, the bending stiffness of the rotor can be improved. Compared to other metallic materials such as steel, an aluminum material has good thermal conductivity properties and less weight. During operation of the axial flux motor, a shaft on which the rotor is fixed heats up. A metallic material, specifically an aluminum material of the rotor wheel can improve heat dissipation radially outwards away from the shaft. Having a rotor wheel comprising a ceramic material may not produce any eddy current losses or may at least reduce eddy current losses in the rotor during operation of the axial flux motor.

In embodiments, the holding structure may comprise an electrically non-conductive material. In examples, the holding structure may comprise a polymer material. Specifically, the holding structure may be made of an electrically non-conductive material, more specifically of a polymer material. Thereby, weight of the rotor can be reduced compared to, for instance, a rotor wherein the holding structure is partially or completely formed of metallic or ceramic material. In addition, eddy current losses can be reduced compared to, for instance, a rotor wherein the holding structure is partially or completely formed of metallic or ceramic material.

In embodiments, the holding structure may be arranged and configured to thermally and/or electrically isolate the plurality of permanent magnets from the rotor wheel.

In embodiments, the holding structure may have a lower thermal conductivity and/or lower electrical conductivity than the rotor wheel. In other words, the rotor wheel may comprise or may be made of a first material and the holding structure may comprise or may be made of a second material. The second material may have a lower thermal conductivity and/or lower electrical conductivity than the first material. This is particularly, advantageous as it enables to thermally and/or electrically isolate the permanent magnets from the rotor wheel.

In embodiments, the holding structure may have a higher thermal expansion coefficient than the plurality of permanent magnets and/or than the rotor wheel. In other words, the rotor wheel may comprise or may be made of a first material and the holding structure may comprise or may be made of a second material and the permanent magnets may comprise or may be made of a third material. The second material may have a higher thermal expansion coefficient than the first material and/or than the third material. These features are particularly advantageous as it improves the holding force of the holding structure with respect to the permanent magnets and/or the attachment force of the holding structure with respect to the rotor wheel. In embodiments, the holding structure may have a thermal expansion coefficient which is between >1 to 10 times of a thermal expansion coefficient of the rotor wheel. Specifically, the holding structure may have a thermal expansion coefficient which is between 2 to 8 times of a thermal expansion coefficient of the rotor wheel. More specifically, the holding structure may have a thermal expansion coefficient which is between 2 to 4 times of a thermal expansion coefficient of the rotor wheel. In other words the thermal expansion coefficient of the holding structure may be larger than 100% and maximally 1000% of the thermal expansion coefficient of the rotor wheel. In embodiments, the holding structure may have a thermal expansion coefficient which is between 2 to 50 times of a thermal expansion coefficient of the plurality of permanent magnets. Specifically, the holding structure may have a thermal expansion coefficient which is between 5 to 25 times of a thermal expansion coefficient of the plurality of permanent magnets. More specifically, the holding structure may have a thermal expansion coefficient which is between 10 to 20 times of a thermal expansion coefficient of the plurality of permanent magnets. In examples, the thermal expansion coefficient of the rotor wheel may be between $5 \times e^{-6} K^{-1}$ to $25 \times e^{-6} K^{-1}$. Specifically, the thermal expansion coefficient of the rotor wheel may about $20 \times e^{-6} K^{-1}$. In examples, the thermal expansion coefficient of the holding structure may be between $20 \times e^{-6} K^{-1}$ to $150 \times e^{-6} K^{-1}$. Specifically, the thermal expansion coefficient of the holding structure may be between $40 \times e^{-6} K^{-1}$ and $100 \times e^{-6} K^{-1}$. In examples, the thermal expansion coefficient of the permanent magnets may be between $-2 \times e^{-6} K^{-1}$ to $14 \times e^{-6} K^{-1}$. Specifically, the thermal expansion coefficient of the permanent magnets may be between $2 \times e^{-6} K^{-1}$ to $7 \times e^{-6} K^{-1}$.

In embodiments, the holding structure may form an outer rim of the rotor which confines the plurality of permanent magnets from radially outwards. In other words, the outer rim may be arranged radially outside the permanent magnets. In embodiments, the holding structure may be attached to the plurality of arms. The holding structure may form a plurality of arm extensions which extend radially outward from the respective arm tips. In embodiments, the plurality of arm extensions may be connected to the outer rim. Specifically, the plurality of arm extensions may be connected a radially inner face of the outer rim. In embodiments, the holding structure may form a plurality of arm encapsulations which at least partially encapsule a respective arm. In embodiments, the plurality of arm encapsulations may extend radially inwards from a respective arm extension. In embodiments, the holding structure may form an inner rim. The inner rim may at least partially surround the outer circumference of the rotor wheel. In embodiments, the inner rim may not form a connected ring, but may comprise a plurality of inner rim segments between two adjacent arms. In embodiments, the plurality of arm encapsulations may extend radially outwards from the inner rim. In embodiments, the inner rim may at least partially surround a circumferentially outer region of the disk-shaped main body. In embodiments, the inner rim may at least partially encapsulate a circumferentially outer region of the disk-shaped main body.

In embodiments, the holding structure may at least partially encapsulate a circumferentially outer region of the disk-shaped main body and the plurality of arms.

In embodiments, the holding structure may be arranged between the plurality of permanent magnets and the rotor wheel such that the plurality of permanent magnets is not in direct contact with the rotor wheel. Thereby, the permanent magnets can be electrically isolated and/or thermally isolated from the rotor wheel, which is particularly advantageous, when the rotor wheel is made of a metallic material and when the holding structure is made of an electrically non-conductive material.

In embodiments, the holding structure may surround each of the plurality of permanent magnets in both circumferential directions, radially inwards and radially outwards.

In embodiments, the holding structure may partially surround a respective permanent magnet on an axial side of the respective permanent magnet. Specifically, one or both radially inner and/or radially outer corners of a respective permanent magnet may be axially covered by the holding structure. This provides further axial holding force to the permanent magnets.

In embodiments, the holding structure may form a plurality of openings in which a respective permanent magnet is fixedly arranged. Specifically, a respective permanent magnet may be fixedly arranged by form fit and/or frictional fit with the holding structure.

In embodiments, the holding structure may be formed by molding, particularly by injection molding. Specifically, the holding structure may be formed by injection molding of a thermoplastic material or by injection molding of a thermosetting material. In embodiments, the holding structure may be formed by injection molding of a polymer. In the holding structure may be formed by a resin injection molding process.

In embodiments, the holding structure may comprise a circumferential groove which is axially recessed in the outer rim. Specifically, when the holding structure is made by molding, e.g. injection molding, the circumferential groove may lead to an improved manufacturing process and/or to an increased product quality because the risk of defects, e.g. shrink holes and/or cavities, may be reduced. In embodiments, the holding structure may comprise a radial groove which is axially recessed in at least one of the plurality of arm extensions. Specifically, when the holding structure is made by molding, e.g. injection molding, the radial groove may lead to an improved manufacturing process and/or to an increased product quality because the risk of defects, e.g. shrink holes and/or cavities, may be reduced.

In embodiments, an axial thickness of the holding structure may be defined between a first axial surface and a second axial surface of the holding structure.

In embodiments, an axial thickness of the permanent magnet may be defined between a first axial surface and a second axial surface of the permanent magnet.

In embodiments, an axial thickness of the holding structure may be larger than an axial thickness of the plurality of permanent magnets radially inwards from a radial position at 0.4 to 0.6 of the radial length of a permanent magnet.

In embodiments, an axial thickness of the holding structure may be equal to or smaller than an axial thickness of the plurality of permanent magnets radially outwards from a radial position at 0.4 to 0.6 of the radial length of a permanent magnet.

In embodiments, the holding structure may comprise at least one protrusion which protrudes radially outwards from the outer rim. In examples, the at least one protrusion may be arranged at a circumferential position between two adjacent arms. Thereby, molding material coming from the region of the arm extensions can join from both circumferential sides in a respective protrusion. Specifically, when the holding structure is made by molding, e.g. injection molding, the protrusion may lead to an improved manufacturing process and/or to an increased product quality because the risk of defects, e.g. shrink holes and/or cavities, may be reduced. More specifically, unwanted joint lines within the holding structure when molding from radially inside radially outwards can be prevented or reduced as the molding material joins in the volume of the protrusion.

In some embodiments, the holding structure may be formed by two or more holding structure plates. In embodiments, the holding structure may be formed by two holding structure halves. In other words, the holding structure may be axially split into two portions, i.e. split by a radial plane defined by the radial direction. In embodiments, the plates may comprise a polymer material and/or a fibre reinforced polymer material.

In embodiments, the rotor wheel may comprise three or more fixation structures which are circumferentially distributed in the disk-shaped main body. In embodiments, at least one of the three or more fixation structures may be axially recessed first axial surface and/or a second axial surface of the disk-shaped main body. In embodiments, at least one of the three or more fixation structures may be axially protruded from a first axial surface and/or a second axial surface of the disk-shaped main body. In embodiments, the holding structure may be in a form fitting engagement with the three or more fixation structures. In embodiments, at least one of the three or more fixation structures may be formed as a through hole extending axially through the disk-shaped main body. Particularly, when the holding structure is formed by injection molding the through holes may provide a reliable attachment. In embodiments, at least one of the three or more fixation structures may be arranged circumferentially between two adjacent arms.

In embodiments, the rotor wheel may comprise a plurality cooling recesses. The plurality of cooling recesses may be arranged in a radially inner region of the disk-shaped main body.

In embodiments, the rotor wheel may comprise a plurality of shaft fixation holes. The plurality of shaft fixation holes may be arranged in a radially inner region of the disk-shaped main body for fixation to a shaft step.

In embodiments, the plurality of permanent magnets may be magnetized in the axial direction. In embodiments, at least one of the plurality of permanent magnets may be formed by a stack of laminated magnetic plates which are stacked in a radial direction.

In embodiments, at least one of the plurality of permanent magnets may have a trapezoidal shape in a plane defined by the radial direction and the circumferential direction.

In embodiments, the plurality of permanent magnets may be circumferentially distributed at equal intervals.

In embodiments, at least one of the plurality of permanent magnets may comprise at least one notched section in a radial surface portion and/or a circumferential surface portion. The notched section may improve the attachment between the magnet and the holding structure.

In embodiments, each of the plurality of permanent magnets forms or is a magnetic pole.

The present disclosure further relates to an axial flux motor for a high-volt fan according to a second aspect of the present invention. The axial flux motor comprises a housing, a shaft, at least one stator and a rotor according to the first aspect. The shaft is rotatably supported in the housing. The at least one stator is fixedly arranged in the housing. The rotor is fixedly arranged on the shaft and adjacent to the at least one stator.

In embodiments, the axial flux motor may comprise two stators. The rotor may be arranged axially between the two stators.

The present disclosure further relates to a high-volt fan for a vehicle according to a third aspect of the present invention. The high-volt fan comprises an axial flux motor according to the second aspect and a fan wheel which is fixedly arranged on the shaft outside the housing.

According to a fourth aspect of the present invention, the present disclosure further relates to a method for manufacturing the rotor of first aspect. The method comprises forming the holding structure by injection molding a mold material around the rotor wheel and the plurality of permanent magnets.

In embodiments, the mold material may be injection molded around the rotor wheel and the plurality of permanent magnets such that a majority of a first axial surface and a majority of a second axial surface of a respective permanent magnet is not covered by the holding structure.

In embodiments, the method may comprise one or more of the following steps: Inserting the rotor wheel in a cavity of a first mold. Inserting the plurality of permanent magnets the cavity of the first mold. Holding each of the plurality of permanent magnets in a molding position circumferentially between two adjacent arms. Closing the cavity or the first mold by a second mold. Forming the holding structure by injection molding the mold material through one or more feed holes which are arranged in the first mold and/or the second mold. In examples, the feed holes may extend to a circumferential outer region of the disk-shaped main body. Thereby, the holding structure is injection molded from radially inside towards radially outside.

In embodiments, at least one of the plurality of permanent magnets may be held in the molding position by a respective pin at a radially inner end of the permanent magnet and/or by a respective plate at a radially outer end of the permanent magnet.

In embodiments, the mold material may comprise a thermoplastic material or a thermosetting material. In embodiments, the mold material may comprise a fibre reinforced and comprises a fibre fraction of between 10% to 80% by weight in relation to total weight of the mold material.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
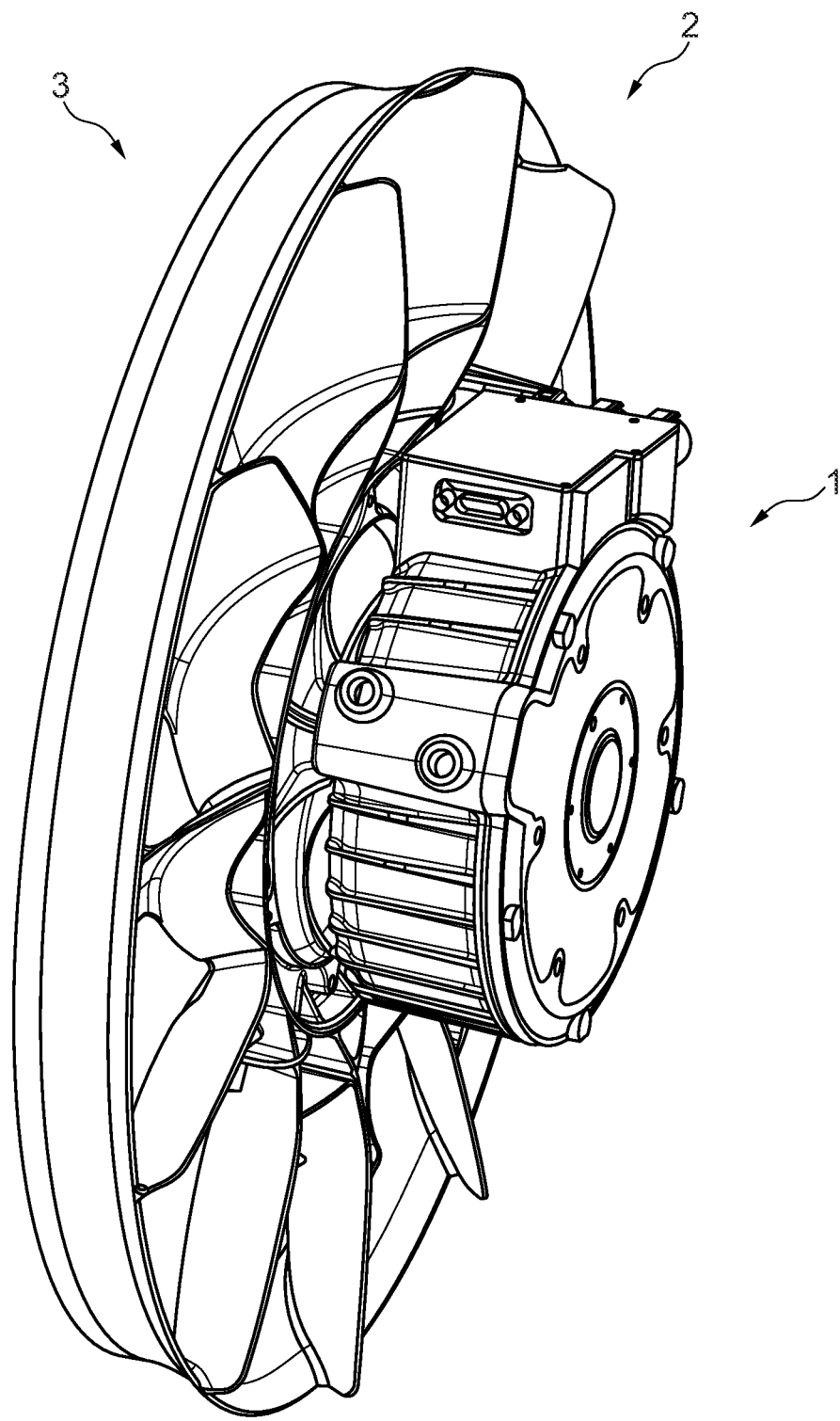
FIG. 1 Shows a perspective view of the high-volt fan according to the third aspect of the present disclosure.

Embodiments of the rotor, the axial flux motor, the high-volt fan and the method according to the present disclosure will be described in reference to the drawings as follows.

In the context of this application, the expression axial, axially or axial direction refer to a rotation axis of the rotor 10 (and/or the shaft 70 and/or the axial flux motor 1). With respect to the figures (see for instance, FIGS. 2 to 6) the axial direction 22 of the rotor 10 is denoted by reference sign 22. The expression radial, radially or radial direction is to be understood relative to the axis/axial direction 22 of the rotor 10 and is denoted with the reference sign 24. The expression circumferential, circumferentially, or circumferential direction is to be understood relative to the axis/axial direction 22 of the rotor 10 and is denoted with the reference sign 26. It should be understood that although one respective exemplary direction is shown in the respective figures, the respective counter direction also falls under the respective expression. For instance, FIG. 3*a* shows the circumferential direction 26 by a clockwise oriented arrow. However, a direction counterclockwise around the axis 22, may also be denoted the circumferential direction 26.

In the context of this application, the expression "at least one of the plurality" may encompass, exactly one, specifically several or each of the plurality of elements, e.g. permanent magnets 50 and/or arms 120.

Figure 2:
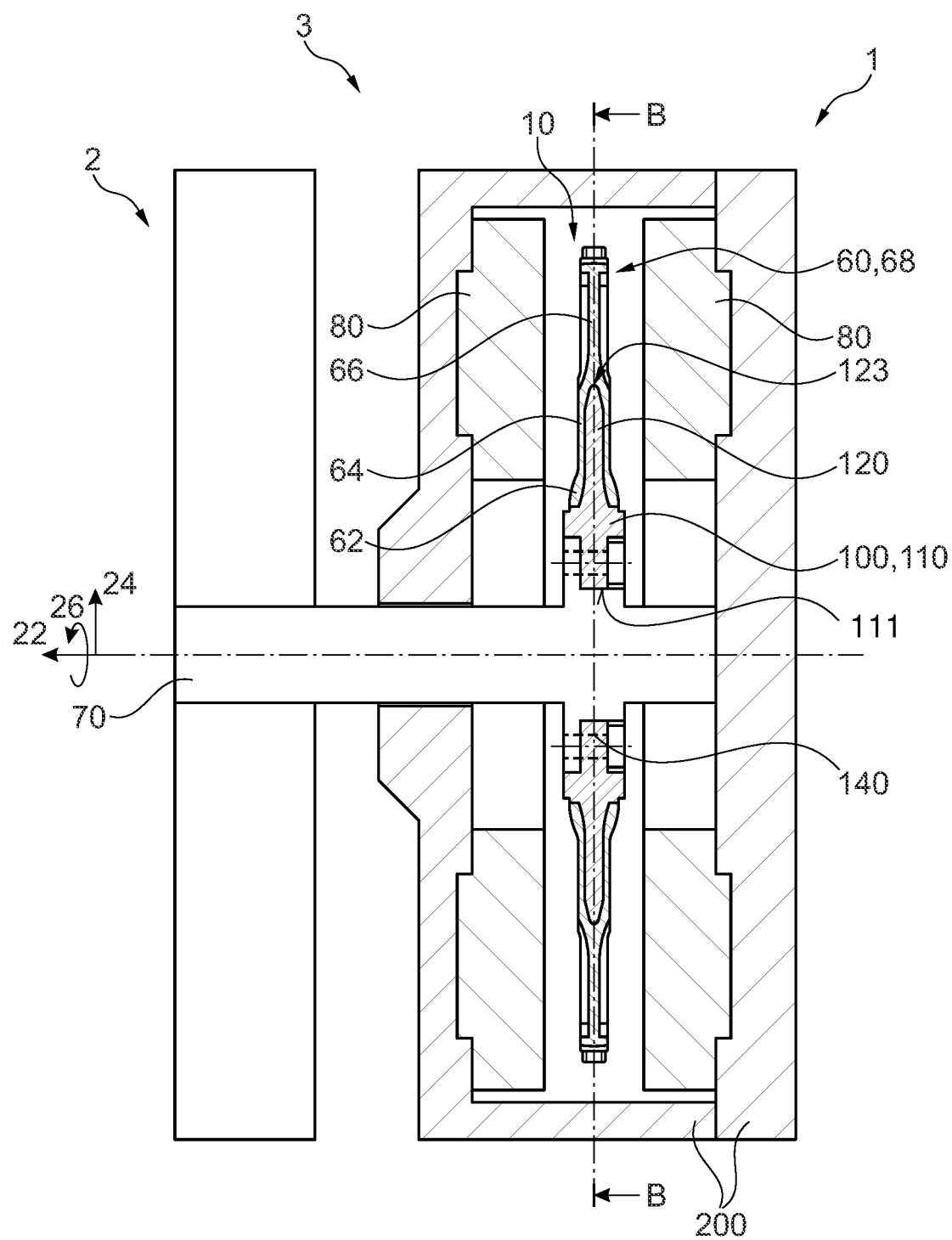
FIG. 2 Shows a schematic sectional view of the high-volt fan with the axial flux motor and the rotor sectioned along line A-A of FIG. 3.
Figure 3A:
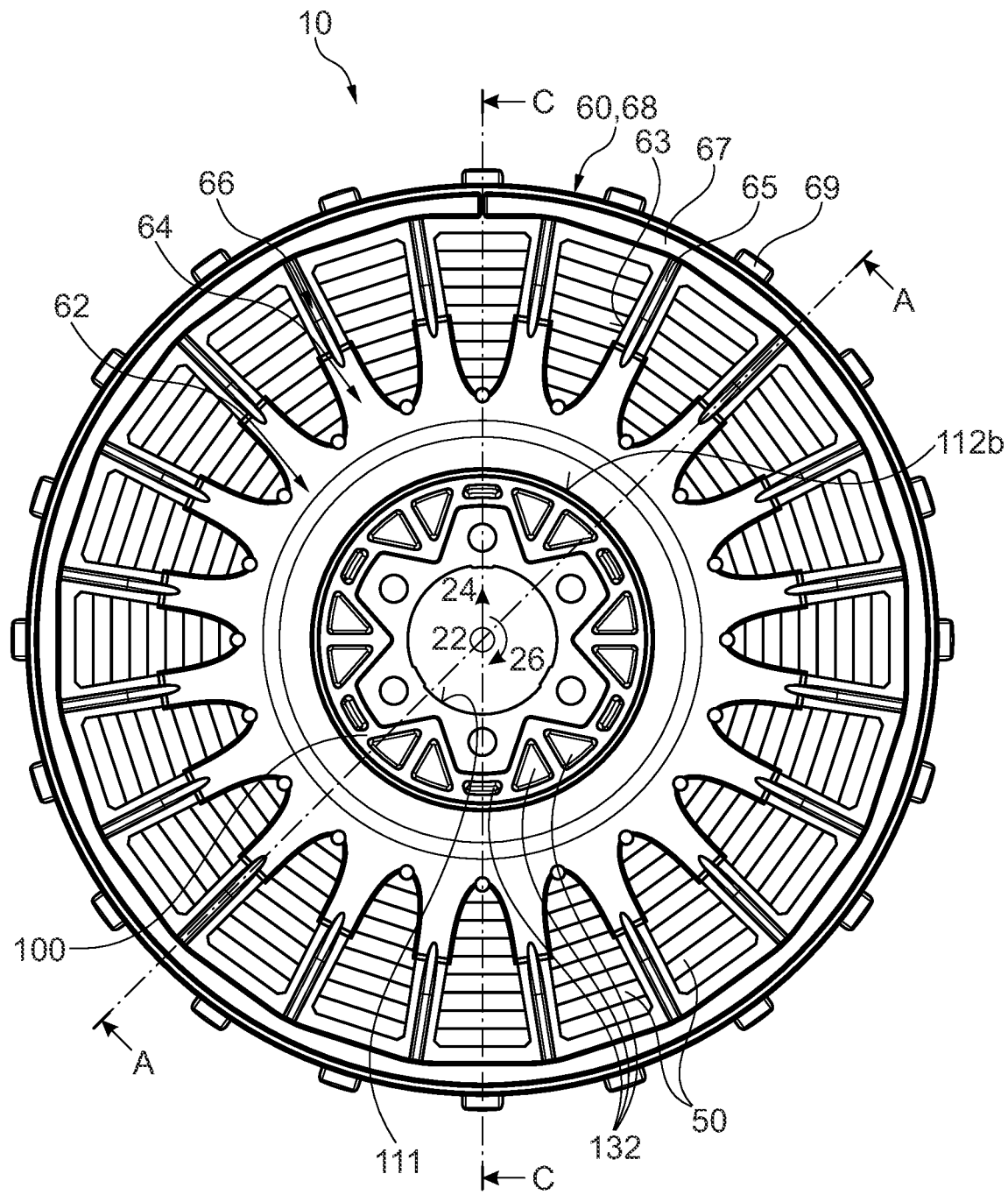
FIG. 3a Shows the rotor according to the first aspect in a view along an axial direction.

FIGS. 1 and 2 illustrates an exemplary high-volt fan 3 in accordance with the present disclosure. The fan 3 comprises an axial flux motor 1 and a fan wheel 2. The fan wheel 2 may be driven by the axial flux motor 1. For this purpose, the fan wheel 2 is arranged in a rotationally fixed manner on a shaft 70 of the axial flow motor 1 outside the motor housing 200 (see, FIG. 2). In the perspective view of FIG. 1, only the motor housing 200 and the fan wheel 2 can be seen for illustration purposes. In addition, in embodiments in which the high-volt 3 comprises a cooling, cooling connections for supplying and discharging cooling fluid for cooling the axial flow motor 1 are shown. In addition, electrical connections of the axial flux motor 1 are shown.

FIG. 2 shows the high-volt fan 3 in more detail in a schematically simplified illustration. In the exemplary embodiment, the axial flux motor 1 comprises a housing 200, a shaft 70, two stators 80 and a rotor 10 according to the first aspect of the present invention. The shaft 70 is rotatably supported in the housing 200. The two stators 80 are fixedly arranged in the housing 200. The rotor 10 is fixedly arranged on the shaft 70 and axially between the two stators 80. Thus, the rotor 10 rotates together with the shaft 70 in the motor housing 200, with the one or both stators 80 driving the rotor 10. For this purpose, each of the stators 80 may comprise an annular stator yoke having a plurality of stator teeth extending circumferentially distributed from the stator yoke in the axial direction 22 towards the rotor 10. The stators 80 or stator teeth thereof are wound with electrical leads to form windings. The electrical leads may have a circular cross-section or another cross-section, such as a rectangular cross-section. The windings may include multi-layer windings. As mentioned before, FIG. 2 is a strongly simplified illustration of the axial flux motor 1 and therefore, the details of e.g. the stators 80 are not shown separately. When a drive current is applied to the windings, a magnetic field may be generated that is suitable to act on the rotor 10 to drive it. An air gap is provided between the rotor 10 and the stators 80 which is clearly visible in FIG. 2. This air gap extends in the axial direction 22 and may also be referred to as an axial air gap. For illustrative purposes, the axial air gaps are depicted in a magnified manner.

In some embodiments, a wall of the housing 200 adjacent to one or both of the stators 80 may comprise a cooling system. For instance, a wall (e.g. housing cover) of the housing 200 on the right side of the right stator 80 in FIG. 2 may comprise a cooling system, e.g. a cooling channel with a fluid cooling. In addition or alternatively, a wall of the housing 200 on the left side of the left stator 80 in FIG. 2 may comprise a cooling system, e.g. a cooling channel with a fluid cooling. In some embodiments, the axial flux motor 1 may comprise only one stator on one axial side of the rotor 10. In other embodiments, the axial flux motor 1 may comprise more than one rotor 10 and/or more than two stators 80 (not shown).

In specific embodiments, the axial flux motor 11 may be designed as a high-voltage axial flux motor 1. This means that the axial flux motor 1 is dimensioned for applications in the high-voltage range at operating voltages of up to 800 volts or 850 volts and more. In particular, the fan 3 may be used for cooling components of an electric vehicle (for example, a battery-powered electric vehicle, in particular a motor vehicle such as a passenger car or a commercial vehicle). Alternatively, the fan 3 may be used in other (specifically mobile) applications where high (cooling) power is required. In particular, these include applications with an electric motor and/or an internal combustion engine. For example, the fan 3 may be used in applications with similarly sized drive motors such as an electric vehicle. Such applications may also include, for example, machines or vehicles with internal combustion engines and/or electric motors such as construction machinery, generators or cranes just to name a few examples.

Figure 3B:
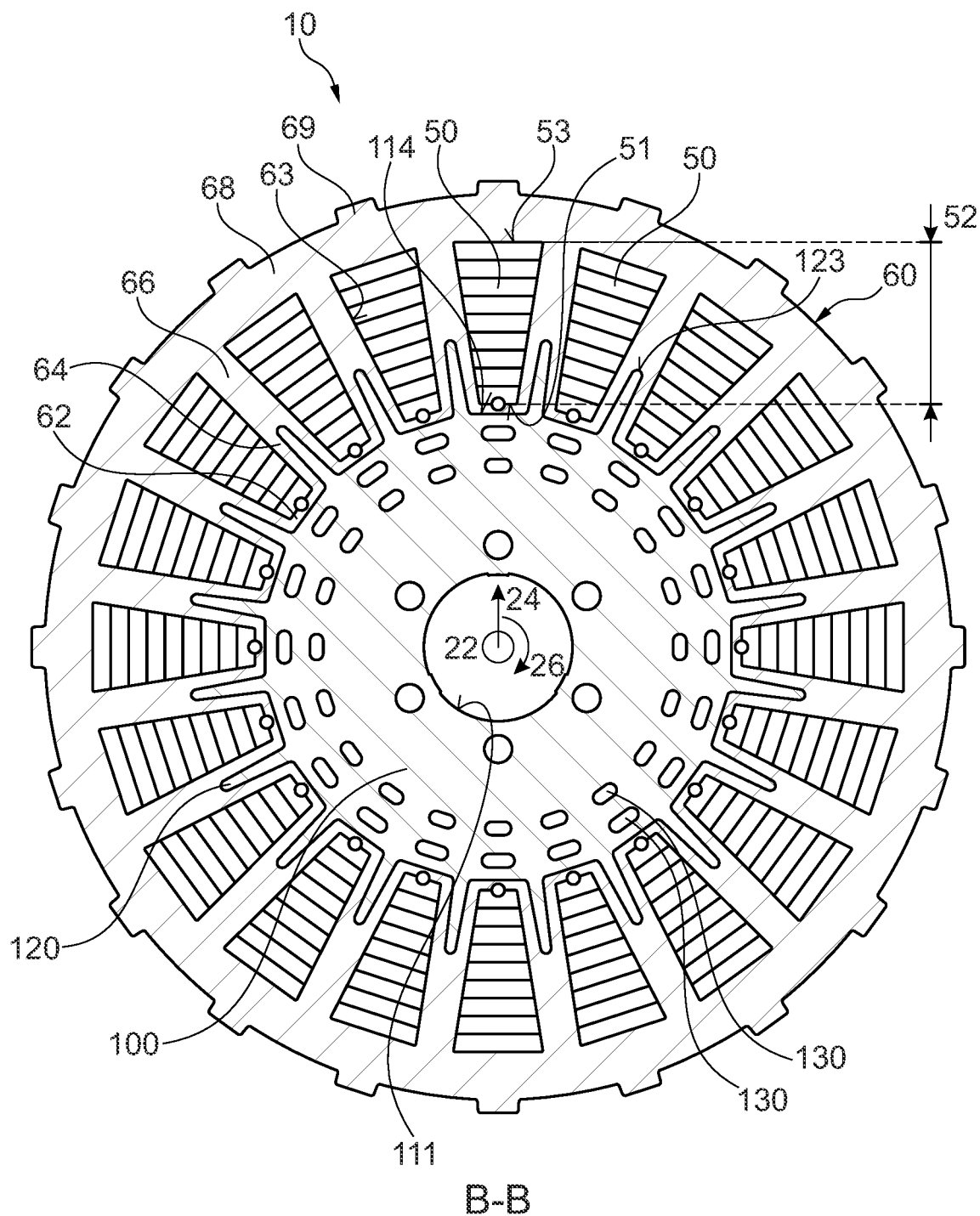
FIG. 3b Shows the rotor of FIG. 3a in a sectional view along line B-B of FIG. 2
Figure 4A:
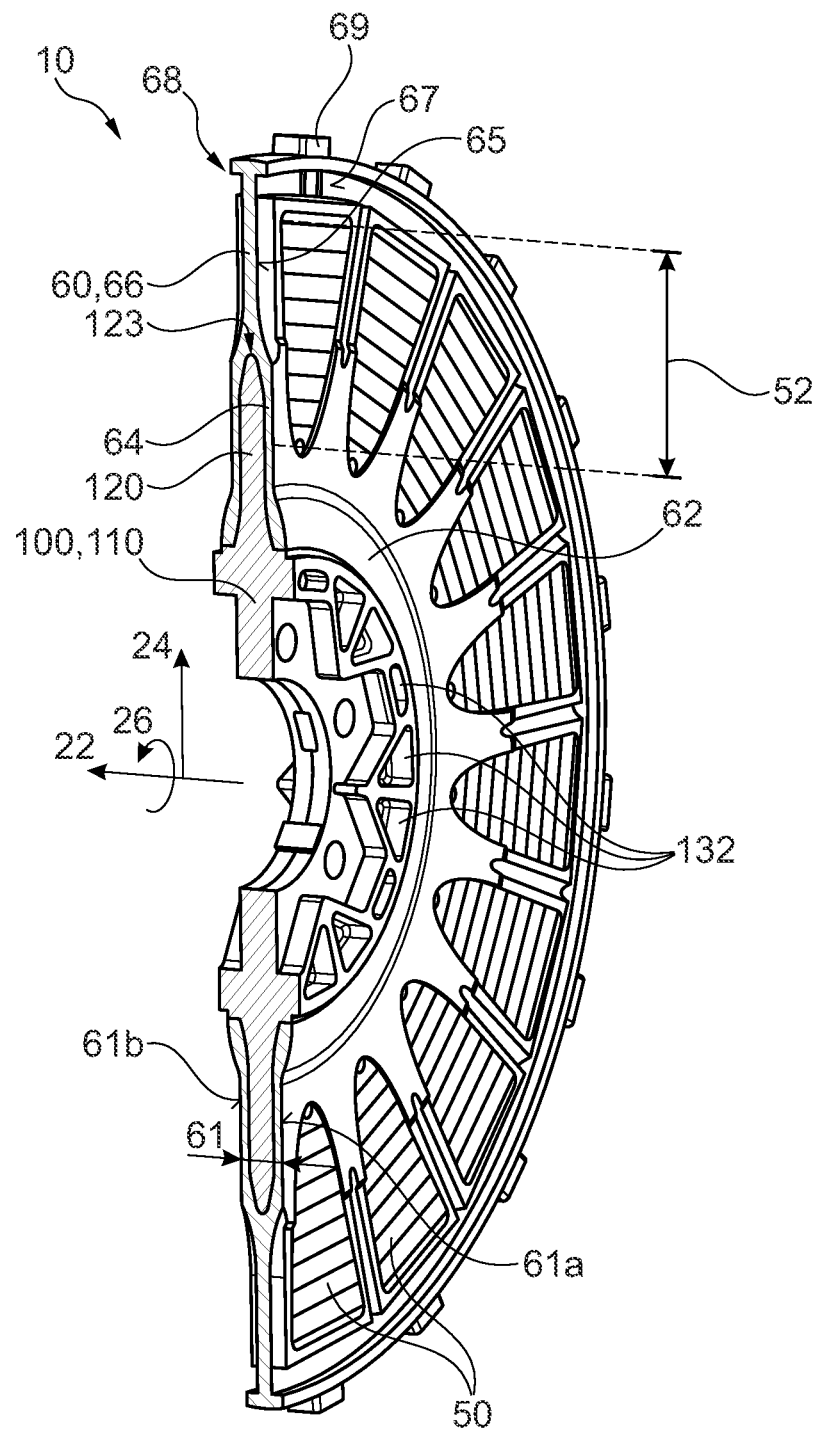
FIG. 4a Shows the rotor according to the first aspect in a perspective sectional view sectioned along line A-A of FIG. 3.

With reference to FIGS. 2 and 4*a*, it can be seen that the rotor 10 comprises a rotor wheel 100, a plurality of permanent magnets 50 and a holding structure 60. The rotor wheel 100 comprises a disk-shaped main body 110 and a plurality of arms 120 (see, in particular FIG. 5). The disk-shaped main body 110 defines an inner circumference 111 and an outer circumference 114. The plurality of arms 120 protrude from the outer circumference 114 radially outwards to a respective arm tip 123. The plurality of arms 120 is circumferentially distributed on the outer circumference 114. The plurality of permanent magnets 50 is distributed circumferentially about the outer circumference 114 and arranged circumferentially between the plurality of arms 120 (see, in particular FIG. 3*b*). Specifically, the plurality of permanent magnets 50 are distanced from the outer circumference 114. The plurality of permanent magnets 50 are also distanced from the plurality of arms 120. The holding structure 60 is attached to the rotor wheel 100 and to the plurality of permanent magnets 50 to hold the plurality of permanent magnets 50 in position (see, FIG. 3*b*). Specifically, the holding structure 60 is arranged between the plurality of permanent magnets 50 and the rotor wheel 100, particularly to hold the permanent magnets distanced from the rotor wheel 100. Providing a rotor wheel 100 with arms 120 extending radially outwards may improve the mechanical strength, specifically the bending stiffness, of the whole rotor 10. Thereby, the risk of the rotor 10 touching a stator 80 of the axial flux motor 1 and a failure or damage of the axial flux motor 1 may be prevented or at least reduced. Improving the bending stiffness is important to confront the influence of thermal deformations, assembling tolerances and vibrations on the rotor 10. In addition axial forces induced by a magnetic field in the permanent magnets 50 during operation of the axial flux motor 1 may act on the rotor 10, specifically may urge, specifically bend, the rotor 10 or portions of the rotor to an axial side. By the provision of the holding structure 60, mechanical forces can be transmitted between the permanent magnets 50 and the rotor wheel 100. Specifically, by the provision of the arms 120 in combination with the holding structure 60 mechanical forces can be transferred to the disk-shaped main body 110 and further to a shaft 70 of the axial flux motor 1.

With reference to, e.g. FIG. 2 or 4a, it can be seen that the rotor 10 is generally disk or annular shaped. Disk- or annular shaped may be understood that a radial diameter dimension of the rotor 10 is a multiple of an axial thickness dimension of the rotor 10. For instance, the diameter dimension may be at least 4 times, specifically at least 8 times and more specifically at least 10 times of the axial thickness dimension. In embodiments, a ratio of a maximum diameter of the rotor 10 to a maximum axial thickness of the rotor may be about 12+/−1.

The disk-shaped main body 110 may also be referred to annular-shaped main body 110. The inner circumference 111 may define a hole for receiving the shaft 70. The rotor wheel 100 may comprise a plurality of shaft fixation holes 140 (see, e.g. FIG. 5). The plurality of shaft fixation holes 140 may be arranged in a radially inner region of the disk-shaped main body 110 for fixation to a shaft step. This is exemplary shown in FIG. 2, wherein the rotor 10 is fixed by radially extending fixation means, e.g. screws, to the shaft step of the shaft 70. The shaft fixation holes 140 are indicated by the dashed lines in FIG. 2 close to the inner circumference 111. Additionally or alternatively, the rotor 10 may be press fitted onto an outer circumference of the shaft 70 with the inner circumference 111 of the disk-shaped main body 110.

Figure 5:
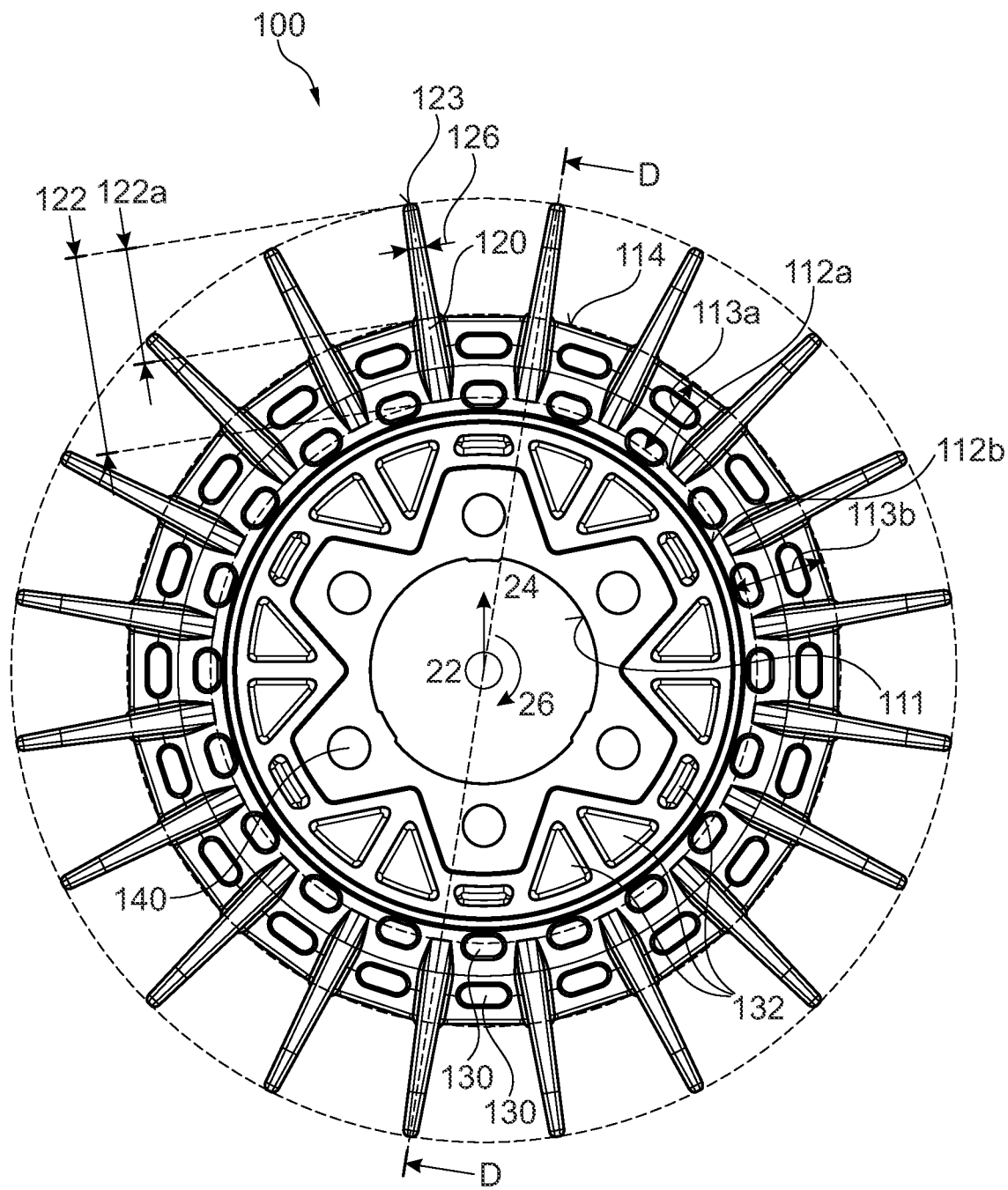
FIG. 5 Shows the rotor wheel in a view along an axial direction.

As best seen in FIG. 5, the arms 120 are distributed about the outer circumference 114 at predetermined equal intervals. This may improve the mechanical strength. In other embodiments, the arms 120 may be distributed about the outer circumference 114 at unequal intervals.

In the exemplary embodiments shown in the drawings, the rotor wheel 100 may comprise a number of twenty arms 120. In other words, the plurality of arms 120 may comprise a number of twenty arms 120. However, it should be understood, that in other embodiments more or less than twenty arms 120 may be provided. For instance, in some embodiments, a number of arms 120 may be between 2 and 50, specifically between 6 and 40, more specifically between 10 and 30, and most specifically 20+/−2. In advantageous embodiments, at least three arms 120 may be provided. Specifically at least three arms 120 which may be distributed equally about the outer circumference 114. Thereby forces may be equally transmitted from the permanent magnets 50 via the holding structure 50 to the distributed arms 120 and the disk-shaped main body 110.

As best seen in FIG. 3b, the plurality of permanent magnets 50 are circumferentially distributed at equal intervals. In the exemplary embodiments of the drawings, the number of permanent magnets 50 is the as the number of arms 120, e.g. twenty. Thereby each permanent magnet 50 may be arranged circumferentially between two adjacent arms 120 (see, e.g., FIG. 3b).

In other embodiments, the number of arms 120 may be larger or smaller than number of permanent magnets 50. For instance, in some embodiments, a number of permanent magnets 50 may be between 2 and 50, specifically between 6 and 40, more specifically between 10 and 30, and most specifically 20+/−2. When the number of arms 120 is smaller than the number of permanent magnets 50, for instance when the number of permanent magnets 50 is two times the number of arms 120, for instance, two respective permanent magnets 50 may be arranged between two adjacent arms 120.

The plurality of permanent magnets 50 is magnetized in the axial direction 22. The permanent magnets 50 may be distributed in the circumferential direction 26. The permanent magnets 50 may be configured to each form at least one magnetic pole in the axial direction 22. In this context, the permanent magnets 50 may be configured to form single-sided magnetic poles or double-sided magnetic poles in each case. In particular, if a stator 80 is arranged on both sides of the rotor 10, the permanent magnets 50 may be configured to form two-sided magnetic poles or permanent magnets may be provided for each side of the rotor 10, as is common to those skilled in the art.

Figure 4B:
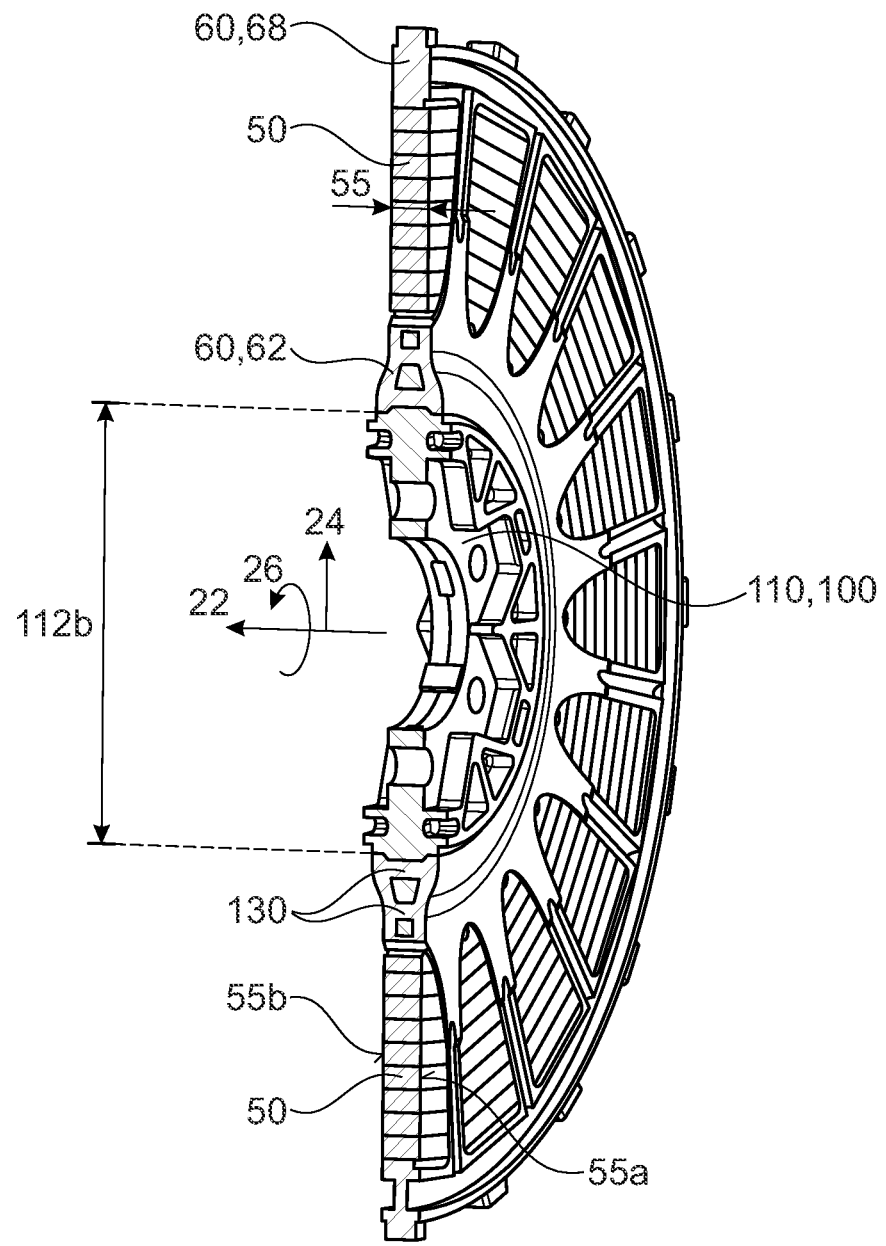
FIG. 4b Shows the rotor according to the first aspect in a perspective sectional view sectioned along line C-C of FIG. 3.

In the example embodiments shown in the figures, the permanent magnets 50 are formed by a stack of laminated magnetic plates which are stacked in a radial direction 22 (see, particularly, FIG. 4b). That means one respective stack of magnetic plates form one permanent magnet which is axially magnetized, specifically which forms a two-sided magnetic pole. Specifically, each permanent magnet 50 may comprise a first axial surface 55a (also referred to as first axial main surface 55a) which is directed in a first axial direction 22 and a second axial main surface 55b (also referred to as second axial main surface 55b) being directed in a second axial direction 22 which is opposite to the first axial direction 22 (see, FIG. 4b). Specifically, the plurality of permanent magnets 50 may be alternatingly magnetized. That means, one permanent magnet 50 may for instance be magnetized from its first axial surface 55a towards its second axial surface 55b, and an adjacent permanent magnet 50 may be magnetized from its second axial surface 55b towards its first axial surface 55a. As best seen in FIG. 3b, the permanent magnets 50 may have a trapezoidal shape in a plane defined by the radial direction 24 and the circumferential direction 26. Specifically, the permanent magnets 50 may have an isosceles trapezoidal shape. Each permanent magnet 50 may extend along a radial length 52 from a radial inner end 51 to a radial outer end 53 of the permanent magnet 50 (see, FIG. 3b). More specifically, a circumferential width of a permanent magnet 50 may be smaller at the radial inner end 51 than at the radial outer end 53. In embodiments, a molding pin interaction feature is provided at the radially inner end 51 of the permanent magnet 50. This molding pin interaction feature may be configured as a recess or hole, e.g. circular recess or circular hole (see, FIGS. 3b and 4b). This feature is particularly advantageous when the holding structure is formed by molding to hold the permanent magnets 50 in position, particularly to bound the permanent magnets 50 radially inwards. An axial thickness 55 of the permanent magnet 50 may be defined between the first axial surface 55a and the second axial surface 55b of the permanent magnet 50. More specifically, the axial thickness 55 of the permanent magnet 50 may be constant (see, FIG. 4b).

In embodiments, at least one of the plurality of permanent magnets 50 may comprise at least one notched section in a radial surface portion and/or a circumferential surface portion. A radial surface portion may be understood as a side surface between the first and second axial main surfaces 55a, 55b which extends in the radial direction 24 and axial direction 22 (see, e.g. FIG. 3b). A circumferential surface portion may be understood as a side surface between the first and second axial main surfaces 55a, 55b which extends in the circumferential direction 26 or a tangential direction relative to the circumferential direction 26 (see, e.g. FIG. 3b). Side surfaces where the reference signs 51 and 53 point to in FIG. 3b may be understood as circumferential surface portions. The notched section may improve the attachment between the magnet and the holding structure. In some embodiments, lateral side surfaces of the permanent magnet 50 between the first and the second axial main surfaces 55a, 55b may comprise one or more notched sections. For instance, a radially extending groove which is circumferentially recessed in one or both radial surface portions of a respective permanent magnet 50 may be provided. Alternatively or additionally to the one or more grooves and or one or more notched sections, one or more protrusions may be provided to improve the attachment between the holding structure 60 and the permanent magnet 50. Alternatively or additionally to the one or more notched sections, the permanent magnets 50 may comprise a beveled section in a radial edge portion and/or a circumferential edge portion. A radial edge portion may be understood as an edge on the first axial main surface 55a or the second axial main surface 55b which extends in the radial direction 24. A circumferential edge portion may be understood as an edge on the first axial main surface 55a or the second axial main surface 55b which extends in the circumferential direction 26 or a tangential direction relative to the circumferential direction 26 (see, e.g. FIG. 3b). Specifically, all radial edge portions and all circumferential edge portions may be beveled. Specifically when the holding structure 60 is formed by molding, the notched sections and the beveled sections can improve the attachment and/or the force transmission in operation of the axial flux motor. In specific embodiments, the holding structure 60 may comprise a higher thermal expansion coefficient than the permanent magnets 50 which further improves the holding function of the holding structure 60. The permanent magnets 50 may be made of a material comprising one or more of neodymium, iron, boron, dysprosium, samarium, and cobalt. In examples, the permanent magnets 50 may be made of NeFeB or SmCo. In embodiments, the stack of laminated magnetic plates may be coated. In examples the coating may comprise nickel and/or epoxy.

The explanations above may apply to at least one, several or all permanent magnets 50.

Although the permanent magnets 50 are configured as separate structures formed by a stack of laminated magnetic plates, in other embodiments, a respective permanent magnet 50 may not have the stacked plate structure but may be formed by one magnetic element. In other embodiments, several or all permanent magnets may be formed as a connected magnet ring structure. For instance, the plurality of permanent magnets 50) may be provided as a plurality of magnetic poles one disk- or annular-shaped permanent magnet (not shown). In such embodiments, circumferentially between the magnetic poles, a plurality of radially extending grooves may be axially recessed in the disk- or annular-shaped permanent magnet into which the plurality of arms and arm extensions may extend. Instead of radially extending grooves, radially extending through holes may be provided in the disk- or annular-shaped permanent magnet between two adjacent magnetic poles into which the plurality of arms and arm extensions may extend.

Again with reference to FIG. 3b, the plurality of arms 120 protrude radially outwards to a radial position between the radial inner end 51 and the radial outer end 53 of a respective permanent magnet 50. In other words, the at least one of the plurality of arms 120 extends radially beyond the radial inner end 51 and end radially before the radial outer end 53. Alternatively described, the arm tip 123 is arranged at a radial position between the radial inner end 51 and the radial outer end 53. A protruding arm length 122a of a respective arm 120 may be defined for an arm portion which extends extend from the outer circumference 114 radially outwards to the arm tip 123. In the example embodiment of FIG. 3b, the arm tip 123 is arranged at a radial position of about 0.4 of the radial length 52 of a permanent magnet 50. "A radial position" may be understood as any position on an envelope circle about the axis/axial direction 22 of the rotor 10, the envelope circle being defined by a radius equal to a line from the axis of the rotor 10 to the radial position. In this regard, in FIG. 5 an exemplary envelope circle is depicted which connects the arm tips 123, i.e. which shows radial positions of the respective arm tips 123. A radial position of about 0.4 (i.e. 40%) of the radial length 52 is to be measured from the radial inner end 51 to the radial outer end 53 of the permanent magnet 50, specifically through the center of the permanent magnet 50 (i.e. circumferentially between the radial side surface portions of a permanent magnet 50).

In other embodiments, the arm tip 123 may be arranged at a radial position between 0.1 to 0.9 of the radial length 52 of a permanent magnet 50. Specifically, the arm tip 123 may be arranged at a radial position between 0.2 to 0.8 of the radial length 52 of a permanent magnet 50. More specifically the arm tip 123 may be arranged at a radial position between 0.25 to 0.75 of the radial length 52 of a permanent magnet 50. These embodiments, specifically a radial position of the arm tip 123 between 0.25 to 0.75 may provide an optimized trade-off between improved bending stiffness and reduced eddy current losses. In examples, the radial position between 0.25 to 0.75 of the radial length 52 is measured from the radial inner end 1) to the radial outer end 53 of the permanent magnet 50. Alternatively described, a radial position 0.25 to 0.75 of the radial length 52 may be described as a radial position in an area (specifically annular area) between 25% to 75% of the radial length 52 measured from the radial inner end 51 towards the radial outer end 53. In embodiments, the respective arm tips 123 of the plurality of arms may define an arm tip circumference (see, FIG. 5), i.e. a circle defined by the arm tips, which may cross the permanent magnets 50 at the respective radial positions as described above, e.g. at a radial position between 0.1 and 0.9 of the radial magnet length 52. The term "protruding arm length 122a" may be understood as the length portion of an arm protruding radially outward from the outer circumference 114.

Figure 6:
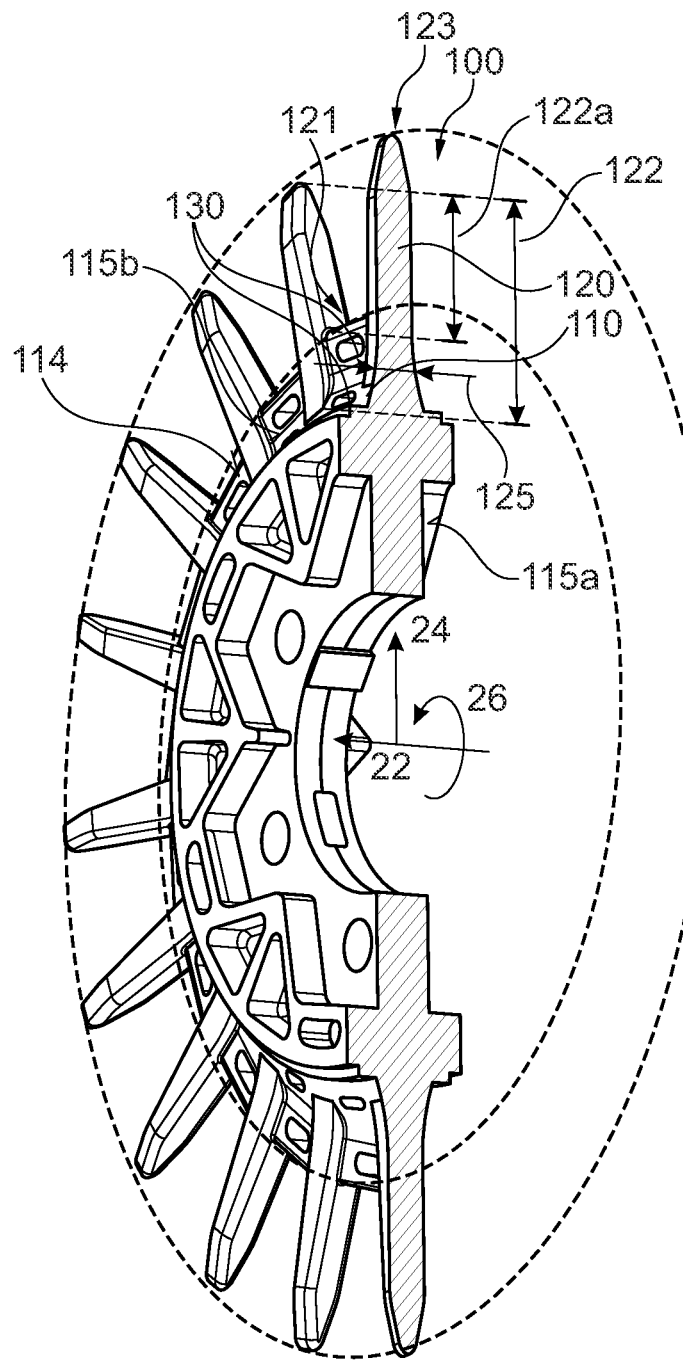
FIG. 6 Shows the rotor wheel in a perspective sectional view sectioned along line C-C of FIG. 3; in a view along an axial direction.

As depicted in FIG. 6, each of the plurality of arms 120 may have an arm length 122 in the radial direction 24. An arm height 125 may be defined in the axial direction 22. An arm width 126 may be defined orthogonally to the arm length 122 arm height 125. The arm tip 123 of each of the plurality of arms 120 may be tapered. Specifically the arm height 125 (see, FIG. 6) and the arm width 126 (see, FIG. 5) are tapered towards the arm tip 123 at least in a portion of the arm length 122. In embodiments, the arm height 125 may taper towards the arm tip 123 at least in a portion of 0.1 of the arm length 122 before the arm tip 123. More specifically, the arm height 125 may taper towards the arm tip 123 at least in a portion of 0.2 of the arm length 122 before the arm tip 123. In embodiments, the arm width 126 may taper towards the arm tip 123 at least in a portion of the arm length 122. Specifically, the arm width 126 may taper towards the arm tip 123 at least in a portion of 0.1 of the arm length 122 before the arm tip 123. More specifically, the arm width 126 may taper towards the arm tip 123 at least in a portion of 0.2 of the arm length 122 before the arm tip 123. Tapering may be understood such that the arm height 125 and/or the arm width 126 may reduce towards the arm tip 123. Tapering may be increasing, e.g. curving, and/or constantly, e.g. conically. By the provision of a tapered arm tip 123, a stiffness gap between the rotor wheel, specifically the at least one arm, and the holding structure can be prevented or at least reduced.

In embodiments, a shape of the arm 120 in a cross-sectional plane defined be the arm height 125 and the arm width 126 may be substantially rectangularly shaped or oval shaped. In embodiments, if the cross-sectional shape of the arm 120 is substantially rectangularly shaped, the corners of the rectangle may be rounded. In embodiments, the arm height 125 may be larger than the arm width 126, at least in a portion a respective arm 120, specifically in a portion of the arm 120 which is protruding radially outwards from the outer circumference 114.

As best seen in FIGS. 5 and 6, in a circumferentially outer region 113a of the disk-shaped main body 110, the arm height 125 may be larger than an axial thickness of the disk-shaped main body 110. Thereby, the arm 120 extends radially inward from the outer circumference 114 while protruding axially from the disk-shaped main body 110 (see, particularly FIG. 6). The disk-shaped main body 110 has a first axial surface 115a which is directed in a first axial direction 22 and a second axial surface 115b being directed in a second axial direction 22 which is opposite to the first axial direction 22 (see, FIG. 4b). The arms 120 protrude axially from both axial sides 115a, 115b of the disk-shaped main body 110 within the circumferentially outer region 113a. In other embodiments, a respective arm 120 may protrude axially from only one of the axial sides 115a, 115b of the disk-shaped main body 110 within the circumferentially outer region 113a (not shown). Thereby, the attachment of the holding structure 60 may be improved. Furthermore, a transfer of forces from the holding structure 60 to the rotor wheel 100 may be improved.

In embodiments, the circumferentially outer region 113a of the disk-shaped main body 110 may extend from the outer circumference 114 to an intermediate circumference 112a (also referred to as first intermediate circumference 112a). The circumferentially outer region 113a within which the arms 120 extend may also be referred to as first circumferentially outer region 113a (the second circumferentially outer region 113b and the second intermediate circumference 112b will be described further below). The intermediate circumference 112a may be arranged along a radial position radially between the inner circumference 111 and the outer circumference 114. Specifically the intermediate circumference 112a may circumferentially extend along the radial position. In other words, the arm length 122 extends from the intermediate circumference 112a to the outer circumference 114. In embodiments the intermediate circumference 112a may be arranged along a radial position between 0.4 and 0.9 of a radial length between the inner circumference 111 and the outer circumference 114. Specifically, the intermediate circumference 112a may be arranged along at a radial position between 0.5 and 0.8 of a radial length between the inner circumference 111 and the outer circumference 114. More specifically, the intermediate circumference 112a may be arranged along at a radial position between 0.6 and 0.7 of a radial length between the inner circumference 111 and the outer circumference 114. In other words, a radial position between 0.4 and 0.9 of the radial length may be described as a radial position in an area between 40% to 90% of the radial length measured from the inner circumference 111 towards the outer circumference 114.

The disk-shaped main body 110 and the plurality of arms 120 are formed integrally. Specifically, the disk-shaped main body 110 and the plurality of arms 120 are formed integrally in one-piece. "Formed integrally" may be understood as forming one structure even though the parts may have been separate originally, e.g. forming one structure by welding or brazing. "Formed integrally in one-piece" may be understood as forming one structure, wherein the parts or elements of the structure have never been separated, e.g. forming one structure by casting, additive manufacturing, sintering or moulding.

The explanations above may apply to at least one, several or all arms 120.

Again with reference to FIG. 5, the rotor wheel 100 comprises a plurality of fixation structures 130 which are distributed circumferentially. Specifically, two concentric circular arrays of fixation structures 130 are provided. In the exemplary embodiments of the figures, the fixation structures 130 are formed as through holes extending axially through the disk-shaped main body 110. In other embodiments, some or all of the fixation structures may be axially recessed in the first axial surface 115a and/or in the second axial surface 115b of the disk-shaped main body 110. As illustrated in FIG. 5, the fixation structures 130 are arranged at circumferential positions between two adjacent arms 120. In other embodiments, one or more fixation structures 130 may be arranged radially inwards of and in extension of an arm 120. Although two concentric circular arrays each including twenty fixation structures 130 are shown, in other embodiments, more or fewer fixation structures 130 may be provided. In some embodiments, no fixation structure 130 like those shown in FIG. 5 may be provided. However, advantageously the rotor wheel 100 may comprise three or more fixation structures 130 which are circumferentially distributed in the disk-shaped main body 110. In embodiments, at least one of the three or more fixation structures 130 may be axially protruded from and/or recessed in the first axial surface 115a and/or the second axial surface 115 of the disk-shaped main body 110. In embodiments, the holding structure 60 may be in a form fitting engagement with the three or more fixation structures 130. In embodiments, at least one of the three or more fixation structures 130 may be formed as a through hole extending axially through the disk-shaped main body 110. Particularly, when the holding structure is formed by injection molding the through holes may provide a reliable attachment. In embodiments, at least one of the three or more fixation structures 130 may be arranged circumferentially between two adjacent arms 120.

Again with reference to FIGS. 5 and 6, the rotor wheel 100 may comprise a plurality cooling recesses 132. The plurality of cooling recesses 132 may be arranged in a radially inner region of the disk-shaped main body 110. In some embodiments, one or more cooling protrusions, e.g. cooling ribs, may be provided additionally or alternatively to the cooling recesses 132 on the disk-shaped main body 110. Specifically, the one or more cooling protrusions may be arranged in a radially inner region of the disk-shaped main body 110. This is particularly advantageous because, during operation of the axial flux motor 1, the arms 120 tend to heat up due to eddy current losses generated in the material of the arms 120. The cooling recesses 132 improve radial heat dissipating from the arms 120 to the surroundings of the rotor 10.

In preferred embodiments, the rotor wheel 100 may be made from an aluminum material. In other embodiments, the rotor wheel 100 may comprise a ceramic material or a metallic material. Specifically, the rotor wheel 100 may be made of a ceramic material or a metallic material, more specifically an aluminum material. In examples, the aluminum material may be an aluminum alloy. The rotor wheel 100 comprising a ceramic or metallic material leads to an improved mechanical strength compared to, for instance polymer or resin materials. Thereby, the bending stiffness of the rotor 10 can be improved. Compared to other metallic materials such as steel, an aluminum material has good thermal conductivity properties and less weight. During operation of the axial flux motor 1, the shaft 70 on which the rotor 10 is fixed heats up. A metallic material, specifically an aluminum material of the rotor wheel 100 can improve heat dissipation radially outwards away from the shaft 70. Having a rotor wheel 100 comprising a ceramic material may not produce any eddy current losses or may at least reduce eddy current losses in the rotor 10 during operation of the axial flux motor 1.

The holding structure 60 may preferably comprise an electrically non-conductive material. In examples, the holding structure 60 may comprise a polymer material. Specifically, the holding structure 60 may be made of an electrically non-conductive material, more specifically of a polymer material. Thereby, weight of the rotor 10 can be reduced compared to, for instance, a rotor 10 wherein the holding structure 60 is partially or completely formed of metallic or ceramic material. In addition, eddy current losses can be reduced compared to, for instance, a rotor 10 wherein the holding structure 60 is partially or completely formed of metallic or ceramic material. In some embodiments, the holding structure 60 may comprise fiber reinforced polymer. In embodiments, the holding structure 60 may comprise or may be formed of fibre-reinforced polyamide, specifically glass-fibre reinforced polyamide. In other embodiments, the holding structure 60 may comprise or may be formed of a carbon-fibre reinforced polymer. In examples, the fibre fraction may be between 10% and 80% of the material, specifically 20% to 70%, more specifically 30% to 60% by weight in relation to a total weight of the holding structure 60.

As best seen in FIG. 3b, the holding structure 60 is arranged and configured to thermally and electrically isolate the plurality of permanent magnets 50 from the rotor wheel 100. In embodiments, the holding structure 60 may be arranged between the plurality of permanent magnets 50 and the rotor wheel 100 such that the plurality of permanent magnets 50 is not in direct contact with the rotor wheel 100. Thereby, the permanent magnets 50 can be electrically isolated and/or thermally isolated from the rotor wheel 100. This is particularly advantageous, when the rotor wheel 100 is made of a metallic material and when the holding structure 60 is made of an electrically non-conductive material. Specifically, the holding structure 60 may surround each of the plurality of permanent magnets 50 in both circumferential directions 26, radially inwards and radially outwards (see, FIG. 3b). Isolate may not be understood to inhibit any thermal or electrical conduction, but to reduce thermal and/or electrical conducting in comparison to a holding structure 60 which would be made from the same material as the rotor wheel 100. Particularly, a thermal isolation of the permanent magnets 50 by means of the holding structure 60 is advantageous to prevent or at least reduce heat dissipation from the arms 120 to the permanent magnets 50.

In embodiments, the holding structure 60 may have a lower thermal conductivity and/or lower electrical conductivity than the rotor wheel 100. In other words, the rotor wheel 100 may comprise or may be made of a first material and the holding structure 60 may comprise or may be made of a second material. The second material may have a lower thermal conductivity and/or lower electrical conductivity than the first material. This is particularly, advantageous as it enables to thermally and/or electrically isolate the permanent magnets 50 from the rotor wheel 100.

In embodiments, the holding structure 60 may have a higher thermal expansion coefficient than the plurality of permanent magnets 50 and/or than the rotor wheel 100. In other words, the rotor wheel 100 may comprise or may be made of a first material and the holding structure 60 may comprise or may be made of a second material and the permanent magnets 50 may comprise or may be made of a third material. The second material may have a higher thermal expansion coefficient than the first material and/or than the third material. These features are particularly advantageous as it improves the holding force of the holding structure 60 with respect to the permanent magnets 50 and/or the attachment force of the holding structure 60 with respect to the rotor wheel 100. In embodiments, the holding structure 60 may have a thermal expansion coefficient which is between >1 to 10 times of a thermal expansion coefficient of the rotor wheel 100. Specifically, the holding structure 60 may have a thermal expansion coefficient which is between 2 to 8 times of a thermal expansion coefficient of the rotor wheel 100. More specifically, the holding structure 60 may have a thermal expansion coefficient which is between 2 to 4 times of a thermal expansion coefficient of the rotor wheel 100. In other words the thermal expansion coefficient of the holding structure 60 may be larger than 100% and maximally 1000% of the thermal expansion coefficient of the rotor wheel 100. In embodiments, the holding structure 60 may have a thermal expansion coefficient which is between 2 to 50 times of a thermal expansion coefficient of the plurality of permanent magnets 50. Specifically, the holding structure 60 may have a thermal expansion coefficient which is between 5 to 25 times of a thermal expansion coefficient of the plurality of permanent magnets 50. More specifically, the holding structure 60 may have a thermal expansion coefficient which is between 10 to 20 times of a thermal expansion coefficient of the plurality of permanent magnets 50. In examples, the thermal expansion coefficient of the rotor wheel 100 may be between $5 \times e^{-6} K^{-1}$ to $25 \times e^{-6} K^{-1}$. Specifically, the thermal expansion coefficient of the rotor wheel may about $20 \times e^{-6} K^{-1}$. In examples, the thermal expansion coefficient of the holding structure $60 \times e^{-6} K^{-1}$ may be between $2 \times e^{-6} K^{-10}$ to $150 \times e^{-6} K^{-1}$. Specifically, the thermal expansion coefficient of the holding structure 60 may be between $40 \times e^{-6} K^{-1}$ and $100 \times e^{-6} K^{-1}$. In examples, the thermal expansion coefficient of the permanent magnets 60 may be between $-2 \times e^{-6} K^{-1}$ to $14 e^{-6} K^{-1}$. Specifically, the thermal expansion coefficient of the permanent magnets 60 may be between $2 \times e^{-6} K^{-1}$ to $7 \times e^{-6} K^{-1}$.

Best seen in FIGS. 3a and 3b, the holding structure 60 may form an outer rim 68 of the rotor 10 which confines the plurality of permanent magnets 50 from radially outwards. In other words, the outer rim 68 may be arranged radially outside the permanent magnets 50. In embodiments, the holding structure 60 may be attached to the plurality of arms 120. The holding structure 60 may form a plurality of arm extensions 66 which extend radially outward from the respective arm tips 123. In embodiments, the plurality of arm extensions 66 may be connected to the outer rim 68.

Specifically, the plurality of arm extensions 66 may be connected a radially inner face of the outer rim 68. In embodiments, the holding structure 60 may form a plurality of arm encapsulations 64 which at least partially encapsule a respective arm 120. Specifically and as shown in FIG. 2 or 4a, the arm encapsulations 64 may fully encapsule the arms 120. In embodiments, the plurality of arm encapsulations 64 may extend radially inwards from a respective arm extension 66. In embodiments, the holding structure 60 may form an inner rim 62. The inner rim 62 may at least partially surround the outer circumference 114 of the rotor wheel 100. In embodiments, the inner rim 62 may not form a connected ring, but may comprise a plurality of inner rim segments between two adjacent arms 120. In embodiments, the plurality of arm encapsulations 64 may extend radially outwards from the inner rim 62.

In embodiments, the inner rim 62 may at least partially surround a second circumferentially outer region 113b of the disk-shaped main body 110. In embodiments, the inner rim 62 may at least partially encapsulate the second circumferentially outer region 113b of the disk-shaped main body 110. More specifically, the holding structure 60 may at least partially encapsulate the second circumferentially outer region 113b of the disk-shaped main body 110 and the plurality of arms 120. The second circumferentially outer region 113b may extend between the outer circumference 114 and a second intermediate circumference 112b. The second intermediate circumference 112b may be arranged along a radial position radially between the inner circumference 111 and the outer circumference 114. Specifically the second intermediate circumference 112b may extend circumferentially a radial position between the inner circumference 111 and the first intermediate circumference 112a. In some embodiments, the second intermediate circumference 112b may coincide with the first intermediate circumference 112a.

In some embodiments, the holding structure 60 may partially surround a respective permanent magnet 50 on one or both axial side 55a, 55b of the respective permanent magnet 50 (see, e.g., FIGS. 3a, 4a, 4b). Specifically, one or both radially inner and/or radially outer corners of a respective permanent magnet 50 may be axially covered by the holding structure. This provides further axial holding force to the permanent magnets. It should be noted that preferably a majority of the first axial main surface 55a and/or a majority of the second axial main surface 55b remains uncovered from the holding structure 60. A majority of the first and second axial main surface 55a, 55b may include at least 70%, specifically at least 80%, and more specifically at least 90% of a total surface area of the respective axial main surface 55a, 55b of a permanent magnet 50.

Specifically, the holding structure 60 comprises the inner rim 62, the arm encapsulations 64, the arm extensions 66 and the outer rim 66. In other words, the holding structure 60 may form a plurality of openings 63 in which a respective permanent magnet 50 is fixedly arranged (see, FIGS. 3a and 3b). Specifically, a respective permanent magnet 50 may be fixedly arranged by form fit and/or frictional fit with the holding structure 60. Specifically, the openings 63 may be open to both axial directions 22. Specifically, the openings 63 may be configured as windows having a surrounding frame. In other words the holding structure 60 may form a plurality of frames defining the windows or openings 63 for receiving the permanent magnets 50. The frames may be formed by the inner rim 62, the arm encapsulations 64, the arm extensions 66 and the outer rim 66.

In preferred embodiments, the holding structure 60 may be formed by molding, particularly by injection molding. Specifically, the holding structure 60 may be formed by injection molding of a thermoplastic material or by injection molding of a thermosetting material. In embodiments, the holding structure 60 may be formed by injection molding of a polymer. In the holding structure 60 may be formed by a resin injection molding process.

With reference to FIGS. 3a and 4a, the holding structure 60 may comprise a circumferential groove 67 which is axially recessed in the outer rim 68. The circumferential groove 67 may be axially recessed in one or both axial surfaces 61a, 61b of the holding structure 60. Specifically, when the holding structure 60 is made by molding, e.g. injection molding, the circumferential groove 67 may lead to an improved manufacturing process and/or to an increased product quality because the risk of defects, e.g. shrink holes and/or cavities, may be reduced. Circumferential groove 67 may be understood as a groove extending in the circumferential direction 26. In embodiments, the circumferential groove 67 may extend about the whole circumference, i.e. 360°, or only about a portion of the circumference, i.e. less than 360°. In embodiments, the circumferential groove 67 may be arranged on both axial sides of the rotor 10. In other words, two circumferential grooves 67 may be provided, one on each axial side of the rotor 10.

Again with reference to FIGS. 3a and 4a, the holding structure 60 may comprise a radial groove 65 which is axially recessed in at least one of the plurality of arm extensions 66. Specifically, when the holding structure 60 is made by molding, e.g. injection molding, the radial groove 65 may lead to an improved manufacturing process and/or to an increased product quality because the risk of defects, e.g. shrink holes and/or cavities, may be reduced. The radial groove 65 may be understood as a groove extending in the radial direction 24. In embodiments, the radial groove 65 may extend radially outwards to the circumferential groove 67, specifically may connect with the circumferential groove 67. In embodiments, the radial groove 65 may be arranged on both axial sides 61a, 61b of the holding structure 60 in the area of the arm extension 66. In other words, two radial grooves 65 may be provided, one on each axial side 61a, 61b of the arm extension 66. In embodiments, each arm extension 66 may comprise one or two radial grooves 65. In embodiments, the radial groove 65 may be tapered in a direction radially inward to reduce stress peaks. In other words, an axial depth of the radial groove 65 may not be constant.

An axial thickness 61 of the holding structure 60 is defined between a first axial surface 61a and a second axial surface 61b of the holding structure 60. The axial thickness 61 of the holding structure 60 may be understood as the maximum axial thickness at a specific radial position. In embodiments, an axial thickness 61 of the holding structure 60 may be larger than an axial thickness 55 of the plurality of permanent magnets 50 radially inwards from a radial position at 0.4 to 0.6 of the radial length 52 of a permanent magnet 50 (see, FIG. 4a). In embodiments, an axial thickness 61 of the holding structure 60 may be equal to or smaller than an axial thickness 55 of the plurality of permanent magnets 50 radially outwards from a radial position at 0.4 to 0.6 of the radial length 52 of a permanent magnet 50.

With respect to FIGS. 3a and 4a, the holding structure 60 comprise a plurality of protrusions 69 which protrude radially outwards from the outer rim 68. In examples, the protrusions 69 may be arranged at respective circumferential positions between two adjacent arms 120. Thereby, molding material coming from the region of the arm extensions 66 can join from both circumferential sides in a respective protrusion 69. Specifically, when the holding structure 60 is made by molding, e.g. injection molding, the protrusion 69 may lead to an improved manufacturing process and/or to an increased product quality because the risk of defects, e.g. shrink holes and/or cavities, may be reduced. More specifically, unwanted joint lines within the holding structure 60 when molding from radially inside towards radially outwards can be prevented or reduced as the molding material can join in the volume of the protrusion 69. In embodiments, the protrusions 69 may be block-shaped. In embodiments, more or less than twenty protrusions 69 may be provided. Some embodiments, may not include any protrusions 69. Specifically at least two protrusions 69 may be provided to prevent or reduce unbalances. In embodiments, a plurality of protrusions 69 may be provided, specifically a number equal to the number of arms. The protrusions may advantageously further provide an option to balance the rotor 10.

In some alternative embodiments, the holding structure 60 may be formed by two or more holding structure plates. In embodiments, the holding structure 60 may be formed by two holding structure halves. In other words, the holding structure 60 may be axially split into two portions, i.e. split by a radial plane defined by the radial direction 24. In embodiments, the plates may comprise a polymer material and/or a fibre reinforced polymer material.

According to a fourth aspect of the present invention, the present disclosure further relates to a method for manufacturing the rotor 10 of first aspect. The method comprises forming the holding structure 60 by injection molding a mold material around the rotor wheel 100 and the plurality of permanent magnets 50. In embodiments, the mold material may be injection molded around the rotor wheel 100 and the plurality of permanent magnets 50 such that a majority of a first axial surface 55*a* and a majority of a second axial surface 55*b* of a respective permanent magnet 50 is not covered by the holding structure 60. As set out above a majority of the first and second axial main surface 55*a*, 55*b* may include at least 70%, specifically at least 80%, and more specifically at least 90% of a total surface area of the respective axial main surface 55*a*, 55*b* of a permanent magnet 50.

In embodiments, the method may comprise one or more of the following steps: Inserting the rotor wheel 100 in a cavity of a first mold. Inserting the plurality of permanent magnets 50 the cavity of the first mold. Holding each of the plurality of permanent magnets 50 in a molding position circumferentially between two adjacent arms 120. Closing the cavity or the first mold by a second mold. Forming the holding structure 60 by injection molding the mold material through one or more feed holes which are arranged in the first mold and/or the second mold. In examples, the feed holes may extend to a circumferential outer region 113*a*, 113*b* of the disk-shaped main body 110. Thereby, the holding structure 60 is injection molded from radially inside towards radially outside.

In embodiments, at least one of the plurality of permanent magnets 50 may be held in the molding position by a respective pin at a radially inner end 51 of the permanent magnet 50 and/or by a respective plate at a radially outer end 53 of the permanent magnet 50.

In embodiments, the mold material may comprise a thermoplastic material or a thermosetting material. In embodiments, the mold material may comprise a fibre reinforced and comprises a fibre fraction of between 10% to 80% specifically 20% to 70%, more specifically 30% to 60% by weight in relation to a total weight of the mold material.

Although the present invention has been described above and is defined in the attached claims, it should be understood that the invention may alternatively be defined in accordance with the following embodiments:

1. A rotor (10) for an axial flux motor (1) comprising:
    a rotor wheel (100) comprising:
        a disk-shaped main body (110) defining an inner circumference (111) and an outer circumference (114), and
        a plurality of arms (120) protruding from the outer circumference (114) radially outwards to a respective arm tip (123), wherein the plurality of arms (120) is circumferentially distributed on the outer circumference (114),
    a plurality of permanent magnets (50) distributed circumferentially about the outer circumference (114) and arranged circumferentially between the plurality of arms (120), and
    a holding structure (60) being attached to the rotor wheel (100) and to the plurality of permanent magnets (50) to hold the plurality of permanent magnets (50) in position.

2. The rotor (10) of embodiment 1, wherein at least one of the plurality of permanent magnets (50) extends along a radial length (52) from a radial inner end (51) to a radial outer end (53), and wherein at least one of the plurality of arms (120) protrudes radially outwards to a radial position between the radial inner end (51) and the radial outer end (53) of a respective permanent magnet (50).

3. The rotor (10) of embodiment 2, wherein at least one of the plurality of arms (120) extends from the outer circumference (114) radially outwards along a protruding arm length (122*a*) to the arm tip (123), wherein the arm tip (123) is arranged at a radial position between 0.1 to 0.9 of the radial length (52) of a permanent magnet (50), specifically at a radial position between 0.2 to 0.8 of the radial length (52) of a permanent magnet (50), more specifically at a radial position between 0.25 to 0.75 of the radial length (52) of a permanent magnet (50).

4. The rotor (10) of any one of the preceding embodiments, wherein the arm tip (123) is tapered.

5. The rotor (10) of any one of the preceding embodiments, wherein each of the plurality of arms (120) has an arm length (122) in the radial direction (24), an arm height (125) in the axial direction (22) and an arm width (126) orthogonally to the arm length (122) arm height (125).

6. The rotor (10) of embodiment 5, wherein the arm height (125) and/or the arm width (126) tapers towards the arm tip (123) at least in a portion of the arm length (122), specifically at least in a portion of 0.1 of the arm length (122) before the arm tip (123), more specifically at least in a portion of 0.2 of the arm length (122) before the arm tip (123).

7. The rotor (10) of any one of embodiments 5 or 6, wherein a shape of the arm (120) in a cross-sectional plane defined be the arm height (125) and the arm width (126) may be substantially rectangularly shaped or oval shaped.

8. The rotor (10) of any one of embodiments 5 to 7, wherein at least in a circumferentially outer region (113*a*) of the disk-shaped main body (110), the arm height (125) is larger than an axial thickness of the disk-shaped main body (110) such that the arm (120) extends radially inward from the outer circumference (114) while protruding axially from the disk-shaped main body (110).

9. The rotor (10) of embodiment 8, wherein the circumferentially outer region (113a) of the disk-shaped main body (110) extends from the outer circumference (114) to an intermediate circumference (112a) arranged along a radial position radially between the inner circumference (111) and the outer circumference (114).

10. The rotor (10) of embodiment 9, wherein the intermediate circumference (112a) is arranged along a radial position between 0.4 and 0.9 of a radial length between the inner circumference (111) and the outer circumference (114), specifically at a radial position between 0.5 and 0.8 of a radial length between the inner circumference (111) and the outer circumference (114), more specifically at a radial position between 0.6 and 0.7 of a radial length between the inner circumference (111) and the outer circumference (114).

11. The rotor (10) of any one of the preceding embodiments, wherein the disk-shaped main body (110) and the plurality of arms (120) are formed integrally, specifically integrally in one-piece.

12. The rotor (10) of any one of the preceding embodiments, wherein the rotor wheel (100) comprises or is made of a ceramic material or a metallic material, specifically an aluminum material.

13. The rotor (10) of any one of the preceding embodiments, wherein the holding structure (60) comprises or is made of an electrically non-conductive material, specifically of a polymer.

14. The rotor (10) of any one of the preceding embodiments, wherein the holding structure (60) has a lower thermal conductivity and/or lower electrical conductivity than the rotor wheel (100).

15. The rotor (10) of any one of the preceding embodiments, wherein the holding structure (60) is arranged to thermally and/or electrically isolate the plurality of permanent magnets (50) from the rotor wheel (100).

16. The rotor (10) of any one of the preceding embodiments, wherein the holding structure (60) has a higher thermal expansion coefficient than the plurality of permanent magnets (50) and/or than the rotor wheel (100).

17. The rotor (10) of any one of the preceding embodiments, wherein the holding structure (60) has a thermal expansion coefficient which is between 1 to 10 times, specifically between 2 to 8 times, more specifically between 2 to 4 times of a thermal expansion coefficient of the rotor wheel (100).

18. The rotor (10) of any one of the preceding embodiments, wherein the holding structure (60) has a thermal expansion coefficient which is between 2 to 50 times, specifically between 5 to 25 times, more specifically between 10 to 20 times of a thermal expansion coefficient of the plurality of permanent magnets (50).

19. The rotor (10) of any one of the preceding embodiments, wherein the holding structure (60) forms an outer rim (68) of the rotor (10) which confines the plurality of permanent magnets (50) from radially outwards.

20. The rotor (10) of any one of the preceding embodiments, wherein the holding structure (60) is attached to the plurality of arms (120) and forms a plurality of arm extensions (66) which extend radially outward from the respective arm tips (123).

21. The rotor (10) of embodiments 19 and 20, wherein the plurality of arm extensions (66) are connected to the outer rim (68).

22. The rotor (10) of any one of the preceding embodiments, wherein the holding structure (60) forms a plurality of arm encapsulations (64) which at least partially encapsule a respective arm (120).

23. The rotor (10) of embodiment 22, if at least dependent on any one of embodiments 20 or 21, wherein the plurality of arm encapsulations (64) extend radially inwards from a respective arm extension (66).

24. The rotor (10) of any one of the preceding embodiments, wherein the holding structure (60) forms an inner rim (62) which at least partially surrounds the outer circumference (114) of the rotor wheel (100).

25. The rotor (10) of embodiment 24, if at least dependent on any one of embodiments 22 or 23, wherein the plurality of arm encapsulations (64) extend radially outwards from the inner rim (62).

26. The rotor (10) of any one of embodiments 24 or 25, wherein the inner rim (62) at least partially surrounds a circumferentially outer region (113a, 113b) of the disk-shaped main body (110).

27. The rotor (10) of any one of embodiments 24 to 26, wherein the inner rim (62) at least partially encapsulates a circumferentially outer region (113a) of the disk-shaped main body (110).

28. The rotor (10) of any one of the preceding embodiments, wherein the holding structure (60) at least partially encapsulates a circumferentially outer region (113a) of the disk-shaped main body (110) and the plurality of arms (120).

29. The rotor (10) of any one of the preceding embodiments, wherein the holding structure (60) is arranged between the plurality of permanent magnets (50) and the rotor wheel (100) such that the plurality of permanent magnets (50) is not in direct contact with the rotor wheel (100).

30. The rotor (10) of any one of the preceding embodiments, wherein the holding structure (60) surrounds each of the plurality of permanent magnets (50) in both circumferential directions (26), radially inwards and radially outwards.

31. The rotor (10) of any one of the preceding embodiments, wherein the holding structure (60) partially surrounds a respective permanent magnet (50) on an axial side of the respective permanent magnet (50).

32. The rotor (10) of any one of the preceding embodiments, wherein the holding structure (60) forms a plurality of openings (63) in which a respective permanent magnet is fixedly arranged.

33. The rotor (10) of any one of the preceding embodiments, wherein the holding structure (60) is formed by injection molding, specifically by injection molding of a thermoplastic material or by injection molding of a thermosetting material.

34. The rotor (10) of any one of the preceding embodiments, if at least dependent on embodiment 19 wherein the holding structure (60) comprises a circumferential groove (67) which is axially recessed in the outer rim (68).

35. The rotor (10) of any one of the preceding embodiments, if at least dependent on embodiment 20 wherein the holding structure (60) comprises a radial groove (65) which is axially recessed in at least one of the plurality of arm extensions (66).

36. The rotor (10) of any one of the preceding embodiments, if at least dependent on embodiment 2, wherein an axial thickness (61) of the holding structure (60) is larger than an axial thickness (55) of the plurality of permanent magnets (50) radially inwards from a radial position at 0.4 to 0.6 of the radial length (52) of a permanent magnet (50).

37. The rotor (10) of any one of the preceding embodiments, if at least dependent on embodiment 2, wherein an axial thickness (61) of the holding structure (60) is equal to or smaller than an axial thickness (55) of the plurality of permanent magnets (50) radially outwards from a radial position at 0.4 to 0.6 of the radial length (52) of a permanent magnet (50).

38. The rotor (10) of any one of the preceding embodiments, if at least dependent on embodiment 19 wherein the holding structure (60) comprises at least one protrusion (69) which protrudes radially outwards from the outer rim (68).

39. The rotor (10) of embodiment 38, wherein the at least one protrusion (69) is arranged at a circumferential position between two adjacent arms (120).

40. The rotor (10) of any one of the preceding embodiments, wherein the holding structure (60) is formed by two or more holding structure plates.

41. The rotor (10) of any one of the preceding embodiments, wherein the rotor wheel (100) comprises three or more fixation structures (130) which are circumferentially distributed, and which are axially recessed and/or axially protruded from a first axial surface (115a) and/or a second axial surface (115b) of the disk-shaped main body (110).

42. The rotor (10) of embodiment 41, wherein the holding structure (60) is in a form fitting engagement with the three or more fixation structures (130).

43. The rotor (10) of any one of embodiments 41 or 42, wherein at least one of the three or more fixation structures (130) is formed as a through hole extending axially through the disk-shaped main body (110).

44. The rotor (10) of any one of embodiments 41 to 43, wherein at least one of the three or more fixation structures (130) is arranged circumferentially between two adjacent arms (120).

45. The rotor (10) of any one of the preceding embodiments, wherein the rotor wheel (100) comprises a plurality cooling recesses (132) arranged in a radially inner region of the disk-shaped main body (110).

46. The rotor (10) of any one of the preceding embodiments, wherein the rotor wheel (100) comprises a plurality of shaft fixation holes (140) arranged in a radially inner region of the disk-shaped main body (110) for fixation to a shaft step.

47. The rotor (10) of any one of the preceding embodiments, wherein the plurality of permanent magnets (50) are magnetized in the axial direction (22).

48. The rotor (10) of any one of the preceding embodiments, wherein each of the plurality of permanent magnets (50) is formed by a stack of laminated magnetic plates which are stacked in a radial direction (22).

49. The rotor (10) of any one of the preceding embodiments, wherein each of the plurality of permanent magnets (50) has a trapezoidal shape in a plane defined by the radial direction (24) and the circumferential direction (26).

50. The rotor (10) of any one of the preceding embodiments, wherein the plurality of permanent magnets (50) are circumferentially distributed at equal intervals.

51. The rotor (10) of any one of the preceding embodiments, wherein each of the plurality of permanent magnets (50) comprise at least one notched section in a radial surface portion and/or a circumferential surface portion.

52. The rotor (10) of any one of the preceding embodiments, wherein each of the plurality of permanent magnets (50) forms or is a magnetic pole.

53. An axial flux motor (1) for a high-volt fan (3) comprising:
a housing (200),
a shaft (70) which is rotatably supported in the housing (200),
at least one stator (80) fixedly arranged in the housing (200), and
a rotor (10) of any one of the preceding embodiments, wherein the rotor (10) is fixedly
arranged on the shaft (70) and adjacent to the at least one stator (80).

54. The axial flux motor (1) of embodiment 53, comprising two stators (80) wherein the rotor (10) is arranged axially between the two stators (80).

55. A high-volt fan (3) for a vehicle, comprising:
an axial flux motor (1) of any one of embodiments 53 or 54, and
a fan wheel (2) which is fixedly arranged on the shaft (70) outside the housing (200).

56. A method for manufacturing the rotor (10) of any one of embodiments 1 to 52, wherein the holding structure (60) is formed by injection molding a mold material around the rotor wheel (100) and the plurality of permanent magnets (50).

57. The method of embodiment 56, wherein the mold material is injection molded around the rotor wheel (100) and the plurality of permanent magnets (50) such that a majority of a first axial surface (55a) and a majority of a second axial surface (55b) of a respective permanent magnet (50) is not covered by the holding structure (60).

58. The method of any one of embodiments 56 or 57, wherein the method comprises:
Inserting the rotor wheel (100) in a cavity of a first mold,
Inserting the plurality of permanent magnets (50) the cavity of the first mold,
Holding each of the plurality of permanent magnets (50) in a molding position circumferentially between two adjacent arms (120),
Closing the cavity or the first mold by a second mold,
Forming the holding structure (60) by injection molding the mold material through one or more feed holes which are arranged in the first mold and/or the second mold and which extend to a circumferential outer region (113a, 113b) of the disk-shaped main body (110).

59. The method of embodiment 58, wherein each of the plurality of permanent magnets (50) is held in the molding position by a respective pin at a radially inner end (51) of the permanent magnet (50) and/or by a respective plate at a radially outer end (53) of the permanent magnet (50).

60. The method of any one of embodiments 56 to 59, wherein the mold material comprises a thermoplastic material or a thermosetting material.

61. The method of any one of embodiments 56 to 60, wherein the mold material is fibre reinforced and comprises a fibre fraction of between 10% to 80% by weight in relation to total weight of the mold material.

The invention claimed is:
1. A rotor (10) for an axial flux motor (1) comprising:
a rotor wheel (100) comprising:
a disk-shaped main body (110) defining an inner circumference (111) and an outer circumference (114), and
a plurality of arms (120) protruding from the outer circumference (114) radially outwards to a respective arm tip (123), wherein the plurality of arms (120) is circumferentially distributed on the outer circumference (114), a plurality of permanent magnets (50) distributed circumferentially about the outer circumference (114) and arranged circumferentially between the plurality of arms (120), and a holding structure (60) being attached to the rotor wheel (100) and to the plurality of permanent magnets (50) to hold the plurality of permanent magnets (50) in position, wherein at least one of the plurality of permanent magnets (50) extends along a radial length (52) from a radial inner end (51) to a radial outer end (53), and wherein at least one of the plurality of arms (120) protrudes radially outwards to a radial position between the radial inner end (51) and the radial outer end (53) of a respective permanent magnet (50), and wherein at least one of the plurality of arms (120) extends from the outer circumference (114) radially outwards along a protruding arm length (122*a*) to the arm tip (123), wherein the arm tip (123) is arranged at a radial position between 0.1 to 0.9 of the radial length (52) of a permanent magnet (50).

2. The rotor (10) of claim 1, wherein the arm tip (123) is tapered.

3. The rotor (10) of claim 1, wherein the disk-shaped main body (110) and the plurality of arms (120) are formed integrally in one-piece.

4. The rotor (10) of claim 3, wherein the rotor wheel (100) comprises or is made of a ceramic material or a metallic material.

5. The rotor (10) of claim 3, wherein the rotor wheel (100) comprises or is made of an aluminum material.

6. The rotor (10) of claim 1, wherein the holding structure (60) comprises or is made of an electrically non-conductive material, wherein the electrically non-conductive material is of a polymer.

7. The rotor (10) of claim 6, wherein the holding structure (60) is formed by injection molding of a thermoplastic material or by injection molding of a thermosetting material.

8. The rotor (10) of claim 1, wherein the holding structure (60) is arranged to thermally and/or electrically isolate the plurality of permanent magnets (50) from the rotor wheel (100).

9. The rotor (10) of claim 1, wherein the holding structure (60) is attached to the plurality of arms (120) and forms a plurality of arm extensions (66) which extend radially outward from the respective arm tips (123).

10. The rotor (10) of claim 1, wherein the holding structure (60) at least partially encapsulates a circumferentially outer region (113*a*) of the disk-shaped main body (110) and the plurality of arms (120).

11. The rotor (10) of claim 1, wherein the holding structure (60) is arranged between the plurality of permanent magnets (50) and the rotor wheel (100) such that the plurality of permanent magnets (50) is not in direct contact with the rotor wheel (100).

12. The rotor (10) of claim 1, wherein the rotor wheel (100) comprises three or more fixation structures (130) which are circumferentially distributed, and which are axially recessed and/or axially protruded from a first axial surface (115*a*) and/or a second axial surface (115*b*) of the disk-shaped main body (110).

13. The rotor (10) of claim 12, wherein the holding structure (60) is in a positive locking engagement with the three or more fixation structures (130).

14. An axial flux motor (1) for a high-volt fan (3) comprising:
a housing (200),
a shaft (70) which is rotatably supported in the housing (200),
at least one stator (80) fixedly arranged in the housing (200), and
a rotor (10) of claim 1, wherein the rotor (10) is fixedly arranged on the shaft (70) and adjacent to the at least one stator (80).

15. A high-volt fan (3) for a vehicle, comprising:
an axial flux motor (1) of claim 14, and
a fan wheel (2) which is fixedly arranged on the shaft (70) outside the housing (200).

16. A method for manufacturing the rotor (10) of claim 1, wherein the holding structure (60) is formed by injection molding a mold material around the rotor wheel (100) and the plurality of permanent magnets (50).

17. The rotor (10) of claim 1, wherein the arm tip (123) is arranged at a radial position between 0.2 and 0.8 of the radial length (52) of the permanent magnet (50).

18. A rotor (10) for an axial flux motor (1) comprising:
a rotor wheel (100) comprising:
a disk-shaped main body (110) defining an inner circumference (111) and an outer circumference (114), and
a plurality of arms (120) protruding from the outer circumference (114) radially outwards to a respective arm tip (123), wherein the plurality of arms (120) is circumferentially distributed on the outer circumference (114),
a plurality of permanent magnets (50) distributed circumferentially about the outer circumference (114) and arranged circumferentially between the plurality of arms (120), and
a holding structure (60) being attached to the rotor wheel (100) and to the plurality of permanent magnets (50) to hold the plurality of permanent magnets (50) in position, wherein each of the plurality of arms (120) has an arm length (122) in the radial direction (24), an arm height (125) in the axial direction (22) and an arm width (126) orthogonally to the arm length (122) and arm height (125), and wherein at least in a circumferentially outer region (113*a*) of the disk-shaped main body (110), the arm height (125) is larger than an axial thickness of the disk-shaped main body (110) such that the arm (120) extends radially inward from the outer circumference (114) while protruding axially from the disk-shaped main body (110).

\* \* \* \* \*